(12) United States Patent
Hamada

(10) Patent No.: US 9,015,366 B2
(45) Date of Patent: Apr. 21, 2015

(54) COMMUNICATION SYSTEM, TERMINAL DEVICE, COMMUNICATION PROCESSING METHOD, COMMUNICATION PROCESSING PROGRAM, STORAGE MEDIUM STORED WITH COMMUNICATION PROCESSING PROGRAM

(75) Inventor: Koji Hamada, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 110 days.

(21) Appl. No.: 13/505,381

(22) PCT Filed: Nov. 5, 2010

(86) PCT No.: PCT/JP2010/069755
§ 371 (c)(1),
(2), (4) Date: Jun. 21, 2012

(87) PCT Pub. No.: WO2011/062074
PCT Pub. Date: May 26, 2011

(65) Prior Publication Data
US 2012/0260006 A1    Oct. 11, 2012

(30) Foreign Application Priority Data
Nov. 17, 2009   (JP) ................. 2009-261656

(51) Int. Cl.
*G06F 3/00*    (2006.01)
*A63F 13/20*    (2014.01)
*A63F 13/98*    (2014.01)

(52) U.S. Cl.
CPC ............... *A63F 13/06* (2013.01); *A63F 13/02* (2013.01); *A63F 2300/1006* (2013.01); *A63F 2300/1031* (2013.01); *A63F 2300/1062* (2013.01); *G06F 2213/0038* (2013.01)

(58) Field of Classification Search
CPC .. A63F 13/06; A63F 13/02; A63F 2300/1006; A63F 2300/1031; A63F 2300/1062; G06F 2213/0038; G06F 13/385; G06F 13/25; G06F 3/0601
See application file for complete search history.

(56) References Cited

U.S. PATENT DOCUMENTS 5,555,243 A * 9/1996 Kakuma et al. ............... 370/352
7,479,064 B2   1/2009 Wakitani
(Continued)

FOREIGN PATENT DOCUMENTS

CN    1593709 A    3/2005
EP    0835676 A1    4/1998
(Continued)

OTHER PUBLICATIONS

Office Action for the corresponding Korean Patent Application No. 10-2012-7012363, dated Jul. 29, 2013.
(Continued)

*Primary Examiner* — Henry Tsai
*Assistant Examiner* — Aurangzeb Hassan
(74) *Attorney, Agent, or Firm* — Matthew B. Dernier, Esq.; Gibson & Dernier LLP

(57) ABSTRACT

A controller to which a second controller is connected arranges, based on predetermined integrated scenario information defining a first input region allotted for the controller and a second input region allotted for the second controller within data regions for packet input data, operation input data corresponding to an operation input from a user in the first input region, and data based on extended input data obtained from an extension apparatus in the second input region, generates packet input data, and transmits it to a device main unit.

19 Claims, 25 Drawing Sheets

(56) References Cited

U.S. PATENT DOCUMENTS

| | | | |
|---|---|---|---|
| 7,488,254 B2 | 2/2009 | Himoto | |
| 2003/0052860 A1 | 3/2003 | Park | |
| 2005/0056997 A1 | 3/2005 | Wakitani | |
| 2005/0215322 A1 | 9/2005 | Himoto | |
| 2005/0233808 A1* | 10/2005 | Himoto et al. | 463/37 |
| 2008/0242412 A1 | 10/2008 | Wakitani | |
| 2009/0197641 A1* | 8/2009 | Rofougaran et al. | 455/556.1 |
| 2010/0214214 A1* | 8/2010 | Corson et al. | 345/158 |

FOREIGN PATENT DOCUMENTS

| | | |
|---|---|---|
| EP | 0932286 A1 | 7/1999 |
| JP | 11032097 A | 2/1999 |
| JP | 11253656 A | 9/1999 |
| JP | 2000354089 A | 12/2000 |
| JP | 2003143436 A | 5/2003 |
| JP | 2005087236 A | 4/2005 |
| JP | 2007083024 A | 4/2007 |
| JP | 2008102788 A | 5/2008 |
| JP | 4255510 B1 | 2/2009 |
| JP | 2010020742 A | 1/2010 |
| WO | 9732641 A1 | 9/1997 |
| WO | 0030314 A1 | 5/2000 |

OTHER PUBLICATIONS

International Search Report for corresponding PCT Application PCT/JP2010/069755, dated Feb. 1, 2011.

European Search Report for corresponding EP Application No. 10831469, dated Jan. 3, 2014.

Chrles M. Kozierok, Indirective Device Connection and Message Routing, The TCP/IP Guide, pp. 1-4, dated Sep. 20, 2005, URL:http://www.tcpipguide.com/free/t_IndirectDeviceConnectionandMessageRouting.htm.

No Author, MAC address, Wikipedia, pp. 1-4, dated Nov. 13, 2009, URL:http:f/en.wikipedia.orgfw/index.php?title=MACaddress&oldid=325682626.

Chinese Office Action for corresponding CN Application No. 201080052068.4, dated Mar. 5, 2014.

Charles M. Kozierok, "Indirective Device Connection and Message Routing", http://www.tcpipguide.com/free/t_indirectDeviceConnectionandMessageRouting.htm 4 pages, Sep. 20, 2005.

* cited by examiner

FIG. 4

Integrated scenario information

| Address | +00 | +01 | +02 | +03 | +04 | +05 | +06 | +07 |
|---------|-----|-----|-----|-----|-----|-----|-----|-----|
| 0x000 | | | | | | | | |
| 0x008 | | | | | | | | |
| 0x010 | | | | | | | | |
| 0x018 | | | | | | | | |
| 0x020 | | | | | | | Rp01 | Rp02 |
| 0x028 | Mg01 | Mg02 | Rp03 | Mg03 | Mg04 | Rp04 | Rp05 | Rp06 |

FIG. 5

Integrated scenario information

| Address | +00 | +01 | +02 | +03 | +04 | +05 | +06 | +07 |
|---------|-----|-----|-----|-----|-----|-----|-----|-----|
| 0x000 | | | | | | | | |
| 0x008 | | | | | | | | |
| 0x010 | | Rp11 | | | | Rp12 | | Mg11 |
| 0x018 | Mg12 | | Rp13 | Mg13 | | | Mg14 | |
| 0x020 | | | | | Rp14 | | | |
| 0x028 | | | Rp15 | | | | | Rp16 |

Extraction scenario information

| Address | +00 | +01 | +02 | +03 | +04 | +05 | +06 | +07 |
|---------|-----|-----|-----|-----|-----|-----|-----|-----|
| 0x000   |     |     |     |     |     |     |     |     |
| 0x008   | Ex01 | Ex02 | Ex03 | Ex04 | Ex05 | Ex06 | Ex07 | Ex08 |
| 0x010   | Ex09 | Ex10 | Ex11 | Ex12 | Ex13 | Ex14 | Ex15 | Ex16 |
| 0x018   | Ex17 | Ex18 | Ex19 | Ex20 | Ex21 | Ex22 | Ex23 | Ex24 |
| 0x020   | Ex25 | Ex26 | Ex27 | Ex28 | Ex29 | Ex30 | Ex31 | Ex32 |
| 0x028   | Ex33 | Ex34 | Ex35 | Ex36 | Ex37 | Ex38 | Ex39 | Ex40 |

FIG. 15

Fundamental input data (terminal device (controller 20))

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | | | | | | | | |
| 0x020 | | | | | | | | |
| 0x028 | | | | | | | | |

Extended input data (extension apparatus (second controller 40A))

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | × | ○ | | | | | | |

Integrated scenario information

| Address | +00 | +01 | +02 | +03 | +04 | +05 | +06 | +07 |
|---|---|---|---|---|---|---|---|---|
| 0x000 | | | | | | | | |
| 0x008 | | | | | | | | |
| 0x010 | Mg08 | Mg09 | | | | | | |
| 0x018 | | | | | | | | |
| 0x020 | | | | | | | | |
| 0x028 | | | | | | | | |

Integrated results (extended packet input data)

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | | | | | | | | |
| 0x020 | | | | | | | | |
| 0x028 | | | | | | | | |

FIG. 16

Fundamental input data (terminal device (controller 20))

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | | | | | | | | |
| 0x020 | | | | | | | | |
| 0x028 | | | | | | | | |

Extended input data (extension apparatus (second controller 40B))

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | E-Stick | E-Stick | | | | | | |

Integrated scenario information

| Address | +00 | +01 | +02 | +03 | +04 | +05 | +06 | +07 |
|---|---|---|---|---|---|---|---|---|
| 0x000 | | | | | | | | |
| 0x008 | | | | | | | | |
| 0x010 | | | | | | | | |
| 0x018 | Rp08 | Rp09 | | | | | | |
| 0x020 | | | | | | | | |
| 0x028 | | | | | | | | |

Integrated results (extended packet input data)

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | E-Stick | E-Stick | | | | | | |
| 0x020 | | | | | | | | |
| 0x028 | | | | | | | | |

FIG. 17

Fundamental input data (terminal device (controller 20))

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | | | | | | | | |
| 0x020 | | | | | | | | |
| 0x028 | | | | | | | | |

Extended input data (extension apparatus (second controller 40B))

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | E-Stick | E-Stick | | | | | | |

Integrated scenario information

| Address | +00 | +01 | +02 | +03 | +04 | +05 | +06 | +07 |
|---|---|---|---|---|---|---|---|---|
| 0x000 | | | | | | | | |
| 0x008 | | | | | Rp08 | Rp09 | | |
| 0x010 | | | | | | | | |
| 0x018 | | | | | | | | |
| 0x020 | | | | | | | | |
| 0x028 | | | | | | | | |

Integrated results (extended packet input data)

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | E-Stick | E-Stick | R-Stick | R-Stick |
| 0x010 | × | ○ | □ | △ | L1 | R1 | L2 | R2 |
| 0x018 | | | | | | | | |
| 0x020 | | | | | | | | |
| 0x028 | | | | | | | | |

FIG. 18

Fundamental input data (terminal device (controller 20))

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | | | | |
| 0x018 | | | | | | | | |
| 0x020 | | | | | | | | |
| 0x028 | | | | | | | | |

Extended input data (extension apparatus (second controller 40C))

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | × | ○ | E-Stick | E-Stick | L1 | R1 | L2 | R2 |

Integrated scenario information

| Address | +00 | +01 | +02 | +03 | +04 | +05 | +06 | +07 |
|---|---|---|---|---|---|---|---|---|
| 0x000 | | | | | | | | |
| 0x008 | | | | | | | | |
| 0x010 | Mg08 | Mg09 | | | Rp0C | Rp0D | Rp0E | Rp0F |
| 0x018 | Rp0A | Rp0B | | | | | | |
| 0x020 | | | | | | | | |
| 0x028 | | | | | | | | |

Integrated results (extended packet input data)

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 | E-Stick | E-Stick | | | | | | |
| 0x020 | | | | | | | | |
| 0x028 | | | | | | | | |

FIG. 19

Fundamental input data (terminal device (controller 20))

| Address | +00 | +01 | +02 | +03 | +04 | +05 | +06 | +07 |
|---|---|---|---|---|---|---|---|---|
| 0x000 | info | info | info | info | info | info | info | info |
| 0x008 | ↑ | → | ↓ | ← | L-Stick | L-Stick | R-Stick | R-Stick |
| 0x010 | × | ○ | □ | △ | L1 | R1 | L2 | R2 |
| 0x018 |  |  |  |  |  |  |  |  |
| 0x020 |  |  |  |  |  |  |  |  |
| 0x028 |  |  |  |  |  |  |  |  |

Extended input data (extension apparatus (second controller 40D))

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | DmA | DmB | DmC |  |  |  |  |  |

Integrated scenario information

| Address | +00 | +01 | +02 | +03 | +04 | +05 | +06 | +07 |
|---|---|---|---|---|---|---|---|---|
| 0x000 | Rp00 | Rp01 | Rp02 | Rp03 | Rp04 | Rp05 | Rp06 | Rp07 |
| 0x008 | Rp08 | Rp09 | Rp0A |  |  |  |  |  |
| 0x010 |  |  |  |  |  |  |  |  |
| 0x018 |  |  |  |  |  |  |  |  |
| 0x020 |  |  |  |  |  |  |  |  |
| 0x028 |  |  |  |  |  |  |  |  |

Integrated results (extended packet input data)

| Address | +00 | +01 | +02 | +03 | +04 | +05 | +06 | +07 |
|---|---|---|---|---|---|---|---|---|
| 0x000 | InfoEX | InfoEX | InfoEX | InfoEX | InfoEX | InfoEX | InfoEX | InfoEX |
| 0x008 | DmA | DmB | DmC | ← | L-Stick | L-Stick | R-Stick | R-Stick |
| 0x010 | × | ○ | □ | △ | L1 | R1 | L2 | R2 |
| 0x018 |  |  |  |  |  |  |  |  |
| 0x020 |  |  |  |  |  |  |  |  |
| 0x028 |  |  |  |  |  |  |  |  |

FIG. 20

| | | |
|---|---|---|
| 0x80 | Attribute value #0 | |
| 0x81 | Integration target packet internal first address #0 (upper) | |
| 0x82 | Integration target packet internal first address #0 (lower) | |
| 0x83 | Integration host I/O device first address #0 (upper) | (1 unit) |
| 0x84 | Integration host I/O device first address #0 (lower) | |
| 0x85 | Trial count #0 | |
| 0x86 | Parameter #0 | |
| 0x87 | Attribute #1 | |
| 0x88 | Integration target packet internal first address #0 (upper) | |
| 0x89 | Integration target packet internal first address #0 (lower) | |
| 0x8A | Integration host I/O device first address #0 (upper) | (1 unit) |
| 0x8B | Integration host I/O device first address #0 (lower) | |
| 0x8C | Trial count #1 | |
| 0x8D | Parameter #1 | |

\>\>Definition is possible as long as there is memory space<<

FIG. 21

| Attribute value (parameter) | | Content defined by attribute value |
|---|---|---|
| 0x00 | Nop (Nop) | Nothing in the integration target packet internal address is processed (function assuming case of making function invalid) |
| 0x01 | Merge (Mg) | Information given by integration target packet internal address and information given by integration host I/O device address are ORed, and obtained result is stored as information given by new integration target packet internal address |
| 0x02 | Replace (Rp) | Information given by integration host I/O device address is replaced with information in integration target packet internal address |
| 0x03 | And (Mask processing) | Information given by integration target packet internal address and value existing in scenario (parameter) are ANDed, and result is written in region indicated by integration target packet internal address |
| 0x04 | Or (Mask processing) | Information given by integration target packet internal address and value existing in scenario (parameter) are ORed, and result is written in region indicated by integration target packet internal address |
| 0x05 | Not (Mask processing) | NOT calculation for information given by integration target packet internal address and value existing in scenario (parameter) is performed, and result is written in region indicated by integration target packet internal address |
| 0x06 | Fill (Fill processing) | Fill value existing in the scenario (parameter) in the information in the integration target packet internal address |
| 0x07-0xFE | RESERVED | Reserved region |
| 0xFF | End Of Attribute Table (EOAT) | Marking always set at the end of the table |

FIG. 22

Format structure (expanded-in-memory view) of integrated scenario information

| 0x80 | Attribute value #0 (0x01 (Mg)) | |
|---|---|---|
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) | (1 unit) |
| 0x84 | Integration host I/O device first address #0 (lower) (0x10) | |
| 0x85 | Trial count #0 (0x01) | |
| 0x86 | Parameter #0 (0x00 (not determined yet)) | |

FIG. 23

Integration target packet (integration target internal address 0x05 is *0x23)

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x23 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 24

Integration host I/O device (Information of integration host I/O device address 0x10 is xxx below)

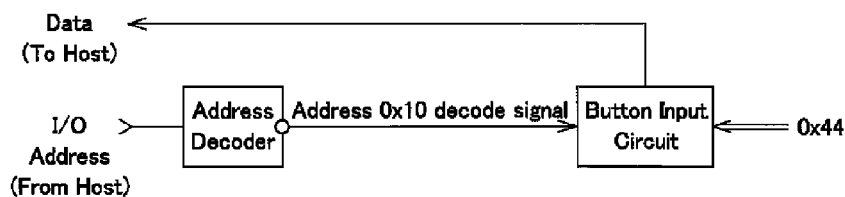

FIG. 25

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x67 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 26

Format structure (expanded-in-memory view) of integrated scenario information

| 0x80 | Attribute value #0 (0x02 (Rp)) | |
|---|---|---|
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) | (1 unit) |
| 0x84 | Integration host I/O device first address #0 (lower) (0x10) | |
| 0x85 | Trial count #0 (0x01) | |
| 0x86 | Parameter #0 (0x00 (not determined yet)) | |

FIG. 27

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x44 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 28

Format structure (expanded-in-memory view) for integrated scenario information

| | | |
|---|---|---|
| 0x80 | Attribute value #0 (0x03 (And)) | |
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) (not determined yet) | (1 unit) |
| 0x84 | Integration host I/O device first address #0 (lower) (0x00) (not determined yet) | |
| 0x85 | Trial count #0 (0x01) | |
| 0x86 | Parameter #0 (0x55) | |

FIG. 29

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x01 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 30

Format structure (expanded-in-memory view) of integrated scenario information

| | | |
|---|---|---|
| 0x80 | Attribute value #0 (0x04 (Or)) | |
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) (not determined yet) | (1 unit) |
| 0x84 | Integration host I/O device first address #0 (lower) (0x00) (not determined yet) | |
| 0x85 | Trial count #0 (0x01) | |
| 0x86 | Parameter #0 (0x55) | |

FIG. 31

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x77 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 32

Format structure (expanded-in-memory view) of integrated scenario information

| 0x80 | Attribute value #0 (0x05 (Not)) | |
|---|---|---|
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) (not determined yet) | (1 unit) |
| 0x84 | Integration host I/O device first address #0 (lower) (0x00) (not determined yet) | |
| 0x85 | Trial count #0 (0x01) | |
| 0x86 | Parameter #0 (0x55) | |

FIG. 33

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x88 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 34

Format structure (expanded-in-memory view) of integrated scenario information

| Address | Content | |
|---|---|---|
| 0x80 | Attribute value #0 (0x06 (Fill)) | |
| 0x81 | Integration target packet internal first address #0 (upper) (0x00) | |
| 0x82 | Integration target packet internal first address #0 (lower) (0x05) | |
| 0x83 | Integration host I/O device first address #0 (upper) (0x00) (not determined yet) | (1 unit) |
| 0x84 | Integration host I/O device first address #0 (lower) (0x00) (not determined yet) | |
| 0x85 | Trial count #0 (0x01) | |
| 0x86 | Parameter #0 (0x55) | |

FIG. 35

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | 0x12 | 0x32 | 0x22 | 0x22 | 0xFF | *0x55 | 0x54 | 0x12 |
| +0x08 | 0x12 | 0x32 | 0x22 | 0x22 | 0xFF | 0x23 | 0x54 | 0x12 |
| . | . | . | . | . | . | . | . | . |
| . | . | . | . | . | . | . | . | . |

FIG. 36

Integration target packet

| Address | 0x00 | 0x01 | 0x02 | 0x03 | 0x04 | 0x05 | 0x06 | 0x07 |
|---|---|---|---|---|---|---|---|---|
| +0x00 | ○ | × | △ | □ | ↑ | ↓ | ← | → |
| +0x08 | L1 | L2 | L3 | R1 | R2 | R3 | START | SELECT |
| . | . | . | . | . | . | . | . | . |
| . | . | . | . | . | . | . | . | . |

FIG. 37

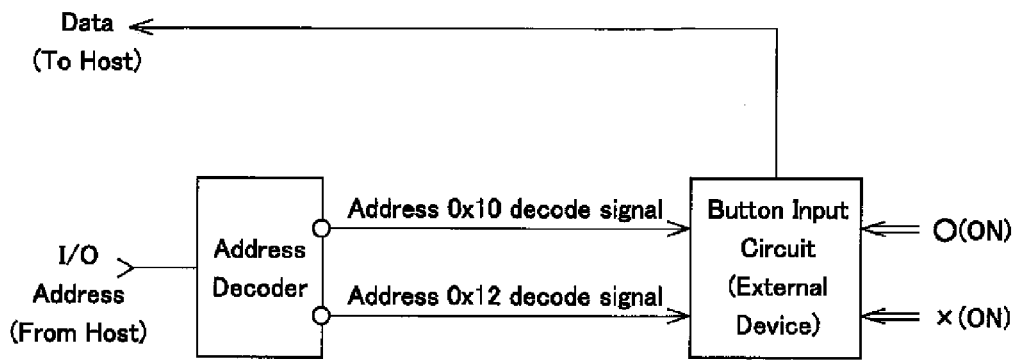

FIG. 38

| 0x80 | Attribute value #0 (0x01 (Mg)) | |
|---|---|---|
| 0x81 | Integration target packet internal first address #0 (upper) (0x00) | |
| 0x82 | Integration target packet internal first address #0 (lower) (0x00) | |
| 0x83 | Integration host I/O device first address #0 (upper) (0x00) | (1 unit) |
| 0x84 | Integration host I/O device first address #0 (lower) (0x10) | |
| 0x85 | Trial count #0 (0x02) | |
| 0x86 | Parameter #0 (0x00 (not determined yet)) | |
| 0x87 | Attribute value #1 (0x06 (Fill)) | |
| 0x88 | Integration target packet internal first address #1 (upper) (0x00) | |
| 0x89 | Integration target packet internal first address #1 (lower) (0x08) | |
| 0x8A | Integration host I/O device first address #1 (upper) (0x00) (not determined yet) | (1 unit) |
| 0x8B | Integration host I/O device first address #1 (lower) (0x00) (not determined yet) | |
| 0x8C | Trial count #1 (0x06) | |
| 0x8D | Parameter #1 (0x00) (Button OFF state) | |

FIG. 39

Post-calculation integration target packet

| Address | 0x00 | 0x01 | 0x02 | 0x03 | 0x04 | 0x05 | 0x06 | 0x07 |
|---|---|---|---|---|---|---|---|---|
| +0x00 | ○Mg | ×Mg | △ | □ | ↑ | ↓ | ← | → |
| +0x08 | 0x00 | 0x00 | 0x00 | 0x00 | 0x00 | 0x00 | START | SELECT |
| . | . | . | . | . | . | . | . | . |
| . | . | . | . | . | . | . | . | . |

COMMUNICATION SYSTEM, TERMINAL DEVICE, COMMUNICATION PROCESSING METHOD, COMMUNICATION PROCESSING PROGRAM, STORAGE MEDIUM STORED WITH COMMUNICATION PROCESSING PROGRAM

TECHNICAL FIELD

The present invention relates to a communication system, a terminal device, a communication processing method, a communication processing program, and storage medium stored with the communication processing program.

BACKGROUND ART

A communication system for transmitting and receiving information between a game device and a controller through a preset, prescribed communication method is well known.

PRIOR ART DOCUMENTS

Patent Documents

[Patent Document 1] JP 2008-102788A

A user wanting to enhance a function of a controller desires to connect a desired extension apparatus to the controller and then use it.

However, in the case of carrying out packet communication of a predetermined type and predetermined capacity between the game device and the controller, transmission and reception of information cannot be carried out between the extension apparatus and the game device merely by connecting the extension apparatus to the controller, thereby not being able to use the extension apparatus.

SUMMARY OF THE INVENTION

The present invention aims to provide a communication system capable of using a desired extension apparatus merely by connecting it to a terminal device for carrying out packet communication of a predetermined type and predetermined capacity between an information processing unit and the terminal device.

A communication system according to a first aspect of the present invention includes an information processing unit, a terminal device, and an extension apparatus. The terminal device transmits packet input data to the information processing unit through packet communication according to a predetermined method for which format and capacity are regulated. The extension apparatus is connected to the terminal device in an attachable and removable manner.

The terminal device includes an operation input means, a packet generation means, a storage means, and an extended data reception means. The operation input means receives an operation input from a user. The packet generation means makes the operation input data obtained from the operation input means into a packet so as to generate the packet input data. The storage means stores integrated scenario information. The integrated scenario information defines a region allotted for the extension apparatus within data regions for the packet input data. The extended data reception means receives extended input data from the connected extension apparatus.

The packet generation means generates packet input data based on the integrated scenario information when the extension apparatus is connected to the terminal device.

A communication system according to a second aspect of the present invention includes an information processing unit, a terminal device, and an extension apparatus. An information processing unit transmits packet output data through packet communication according to a predetermined method for which format and capacity are regulated. The terminal device receives packet output data from the information processing unit. The extension apparatus is connected to the terminal device in an attachable and removable manner.

The terminal device includes a packet data processing means and a storage means. The packet data processing means executes analysis processing of the received packet output data. The storage means stores extraction scenario information. The extraction scenario information defines a region allotted for the extension apparatus within data regions for the packet output data.

When the extension apparatus is connected, the packet data processing means extracts the extended output data for the extension apparatus from the packet output data based on the extraction scenario information, and then transmits the extracted extended output data to the extension apparatus.

According to the present invention, when transmitting and receiving data between the information processing device and the terminal device through packet communication in a predetermined format and predetermined capacity, a desired extension apparatus may be used merely by wire-connecting that extension apparatus to the terminal device.

BRIEF DESCRIPTION OF DRAWINGS

FIG. 4 is a diagram showing exemplary integrated scenario information;

FIG. 5 is a diagram showing other exemplary integrated scenario information;

FIG. 15 is a diagram showing an example of fundamental input data, extended input data, integrated scenario information, and integrated results;

FIG. 16 is a diagram showing another example of fundamental input data, extended input data, integrated scenario information, and integrated results;

FIG. 17 is a diagram showing another example of fundamental input data, extended input data, integrated scenario information, and integrated results;

FIG. 18 is a diagram showing another example of fundamental input data, extended input data, integrated scenario information, and integrated results;

FIG. 19 is a diagram showing another example of fundamental input data, extended input data, integrated scenario information, and integrated results;

FIG. 20 is a diagram showing an extended-in-memory view of a format for integrated scenario information;

FIG. 21 is a diagram showing a list of attribute values;

FIG. 22 is a diagram showing an example format for integrated scenario information;

FIG. 23 is a diagram illustrating exemplary integration target packets;

FIG. 24 is a diagram illustrating an integration host I/O device;

FIG. 25 is a diagram illustrating post-calculation integration target packets;

FIG. 26 is a diagram illustrating an example format for integrated scenario information;

FIG. 27 is a diagram illustrating an example of post-calculation integration target packets;

FIG. 28 is a diagram illustrating an example format for integrated scenario information;

FIG. 29 is a diagram illustrating post-calculation integration target packets;

FIG. 30 is a diagram illustrating an example format for integrated scenario information;

FIG. 31 is a diagram illustrating post-calculation integration target packets;

FIG. 32 is a diagram illustrating an example format for integrated scenario information;

FIG. 33 is a diagram illustrating post-calculation integration target packets;

FIG. 34 is a diagram illustrating an example format for integrated scenario information;

FIG. 35 is a diagram illustrating post-calculation integration target packets;

FIG. 36 is a diagram illustrating integration target packets;

FIG. 37 is a diagram illustrating an integration host I/O device;

FIG. 38 is a diagram illustrating an example format for integrated scenario information; and FIG. 39 is a diagram illustrating post-calculation integration target packets.

DETAILED DESCRIPTION OF THE INVENTION

[General Structure of Communication System of this Embodiment]

Figure 1:
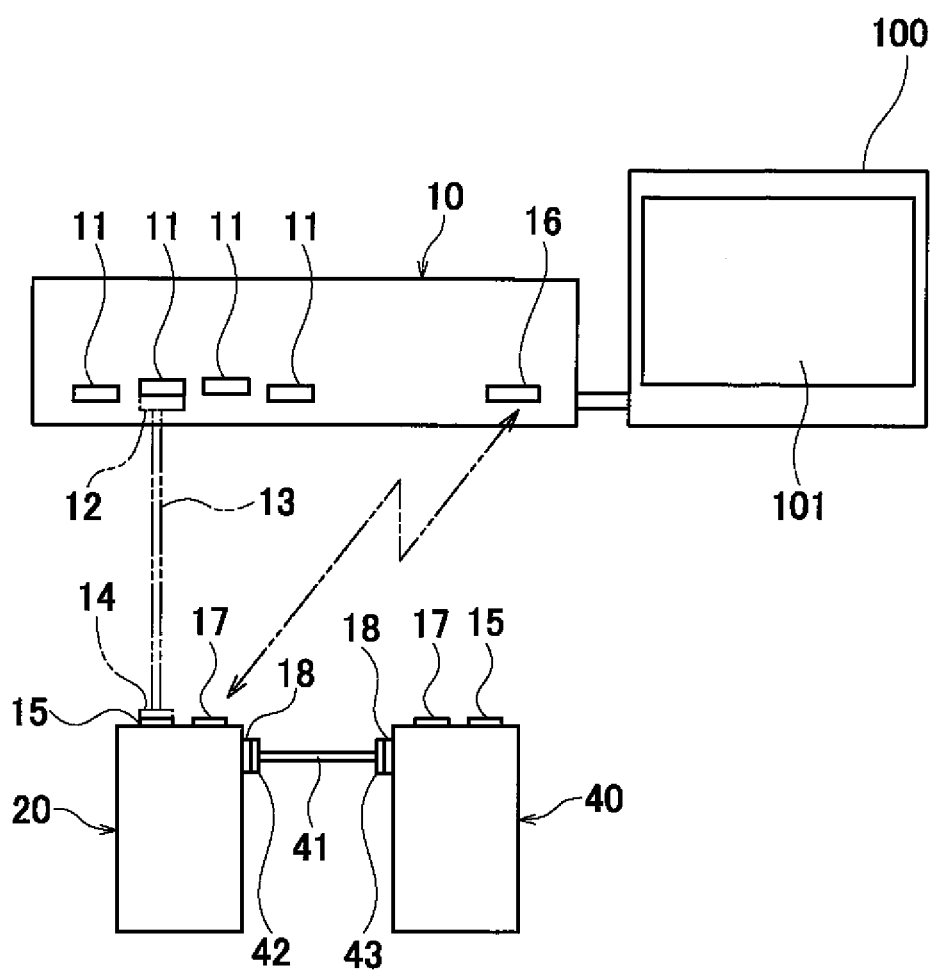
FIG. 1 is a diagram schematically showing a communication system as an embodiment of the present invention.

A communication system as an embodiment of the present invention is schematically illustrated in FIG. 1.

This communication system includes an entertainment device (hereafter referred to device main unit) 10, which is an exemplary information processing unit (video game device), a controller 20 as a terminal device operated by a user (player), a second controller 40, which functions as an attachable and removable extension apparatus that is wire connected to the controller 20 via an extension cable 41, and a monitor device (e.g., television receiver) 100, which is supplied with picture and sound signals from the device main unit 10. The monitor device 100 has an image display (display screen) 101 for displaying the images based on the picture signals supplied from the device main unit 10. Note that the removable wire connection between the controller 20 and the second controller 40 includes connection by the aforementioned extension cable 41 as well as direct connection between respective terminals of the two controllers.

Information is transmitted and received through communication between the device main unit 10 and the controller 20. Communication method therebetween may be through either a wireless connection or a wired connection via a cable 13. With the controller 20 according to this embodiment, communication is possible using both wired and wireless methods. Wired communication is carried out while the controller 20 is wire connected to the device main unit 10, and wireless communication is carried out while the wired connection is disconnected.

In the example of FIG. 1, the device main unit 10 has multiple controller ports 11 (four ports in this embodiment). In the case of wire-connecting the controller 20 with the device main unit 10 via the cable 13, the cable 13 has a plug-in connector 12 provided on an end inserted into an arbitrary one of the controller ports 11 of the device main unit 10 and electrically connected, and a plug-in connector 14 provided on the other end is inserted into a connection port 15 of the controller 20 and electrically connected. Note that use of another controller port 11 allows simultaneous wired connections of multiple controllers 20 to the device main unit 10. The wired connection method used between the device main unit 10 and the controller 20 should allow communication in both directions, and a universal serial bus (USB) connection is adopted in this embodiment.

Furthermore, the controller 20 is provided with a wireless communication unit (antenna) 17 for transmitting and receiving information through wireless communication to and from a wireless communication unit (antenna) 16 of the device main unit 10. There are various communication methods that can be applied between the wireless communication units 16 and 17 such as a general purpose short-range, high-speed wireless communication method such as Bluetooth™ communication or an exclusive short-range, wireless communication method as long as wireless communication is possible therebetween. Bluetooth™ wireless communication (hereafter referred to as BT communication) is adopted in this embodiment.

During BT communication between the device main unit 10 and the controller 20, data is mutually transmitted and received therebetween through packet communication in a predetermined format (e.g., I2C format) and capacity (e.g., 48 bytes). Note that data may be received through packet communication in the above predetermined format and capacity even with a USB connection. The case of transmitting and receiving data through packet communication in I2C format and 48 bytes for both the USB connection and the BT communication is described in this embodiment.

The second controller 40 may be the same type as the controller 20, or it may be a different type. Furthermore, the second controller 40 may be one that is only usable as an extension apparatus of the controller 20, and cannot be used alone. Moreover, the terminal device may be a device (e.g., portable game console) other than the controller 20, and the extension apparatus may be an input device (e.g., mouse, keyboard, joystick, or the like) or an output device (speaker or the like) other than the controller 40. The extension apparatus may also not include the CPU.

In this embodiment, a case using the same type of second controller 40 as the controller 20 as the extension apparatus of the controller 20 is exemplified. Note that in the following description, when differentiating between components of the controller 20 and those of the second controller 40, 'M' is attached to the components of the controller 20, and 'E' is attached to the components of the second controller 40 so as to differentiate them. Furthermore, state of the second controller 40 not wire connected to the controller 20 is referred to as fundamental mode, and state of the second controller 40 wire connected to the controller 20 is referred to as extend mode.

The second controller 40 functions as an extension apparatus for the controller 20 in the extend mode. When wire-connecting the controller 20 and the second controller 40 using the extension cable 41, a plug-in connector 42 provided on an end of the extension cable 40 is inserted into a connection port 18 of the controller 20 and electrically connected, and a plug-in connector 43 provided on the other end is inserted into a connection port 18 of the controller 40 and electrically connected. Note that the controllers 20 and 40 may be connected by providing a plug-in connector to the second controller 40 and connecting this plug-in connector to the connection port 18 of the controller 20. Furthermore, when the second controller 40 and the device main unit 10 are capable of direct communication through a wired or wireless connection, direct communication therebetween in the extend mode is prohibited.

[Exterior of Device Main Unit]

Aside from the above-mentioned controller ports 11 (11A to 11D) and the wireless communication unit 16, the device main unit 10 is provided with a memory card slot in which a memory card, which includes semiconductor memory, may be inserted/ejected, a disk tray, an open/close button for opening and closing the disk tray, an on/standby/reset button for turning power on, into standby mode, or resetting, an audio-video output terminal (AV multi-output terminal), a PC card slot, an optical digital output terminal, an IEEE (Institute of Electrical and Electronics Engineers) 1394 connection terminal, a power switch, and an AC power input terminal not shown in the drawing.

The device main unit 10 is capable of executing a video game based on an application program for the video game recorded on a disk medium such as a DVD-ROM or CD-ROM, for example, and reproducing (decoding) video data and audio data recorded on a DVD or CD.

Note that the above-mentioned application program and video/audio data are read from not only disk media but also from semiconductor memory and tape media. It may also be supplied from a wired or wireless wide-area or intra-area communication line.

[Internal Circuit Structure of Device Main Unit]

Figure 2:
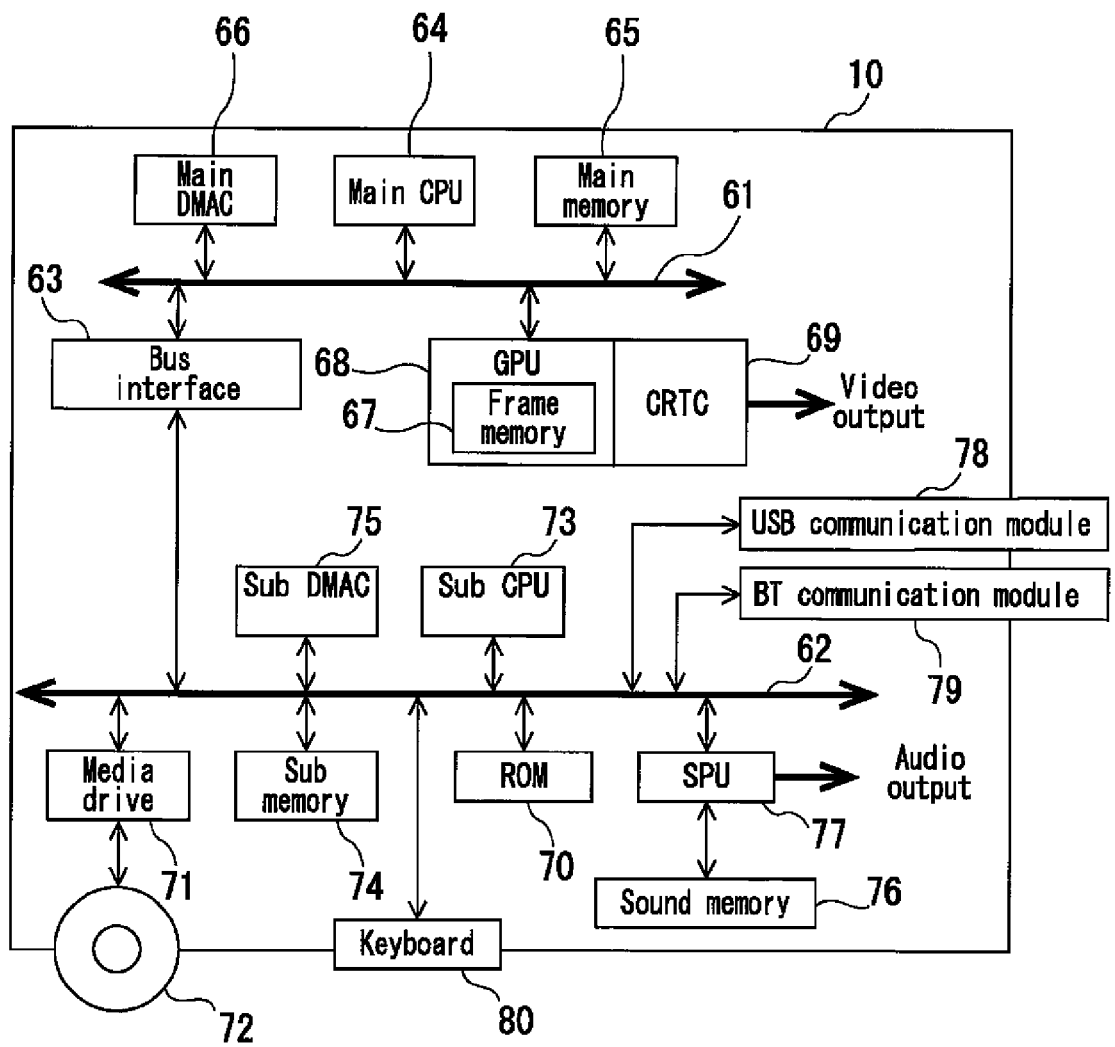
FIG. 2 is a block diagram showing a principal internal structure of a device main unit.

FIG. 2 shows the principal internal structure of the device main unit 10.

As shown in FIG. 2, the device main unit 10 has a main bus 61 and a sub bus 62, which are either connected or disconnected from each other via a bus interface 63.

A main CPU 64, main memory 65 configured by RAM, a main direct memory access controller (DMAC) 66, and a graphic processing unit (GPU) 68 including frame memory 67 are connected to the main bus 61. A CRT controller (CRTC) 69, which is a control means for generating video output signals, is connected to the GPU 68. An image according to video output signals is displayed on a predetermined display unit (the image display unit 101 of the monitor unit 100 according to this embodiment) connected to the device main unit 10 via a cable or the like.

The main CPU 64 reads a boot program from ROM 70 on the sub bus 62 via the bus interface 63 once the device main unit 10 starts running, executes that boot program, and executes an operating system. Furthermore, it controls a media drive 71, reads out an application program or data from a medium 72 loaded into the media drive 71, and stores it in the main memory 65. Moreover, geometric processing is carried out for various types of data read out from the medium 72, such as three-dimensional object data (e.g., coordinate values of a polygon vertex (representative point)) configured by multiple primitive figures (polygons). A display list including contents of polygon definition information is generated through the geometric processing. Furthermore, data compressed based on an MPEG (Moving Picture Experts Group) system or a JPEG (Joint Photographic Experts Group) system is decompressed. In other words, the main CPU 64 has an information deciphering function for deciphering information according to a software program.

The polygon definition information includes drawing area setting information and polygon information. The drawing area setting information includes coordinates of a drawing clipping area for canceling drawing when offset coordinates of a drawing area in a frame buffer address and coordinates of a polygon outside of the drawing area exist. The polygon information includes polygon attribute information and vertex information; wherein the polygon attribute information is information specifying shading mode, a blending mode, texture mapping mode, and the like, and vertex information is information of coordinates of a vertex within the drawing area, coordinates of a vertex within a texture area, and vertex color.

The GPU 68 stores drawing contexts, reads out an appropriate drawing context based on identification information of image context included in the display list informed from the main CPU 64, rendering processing is performed based thereupon, and a polygon is drawn in the frame memory 67. The frame memory 67 may be used as texture memory, and thus a pixel image in the frame memory 67 may be applied to the polygon drawn as texture.

The main DMAC 66 controls DMA transfer for respective circuits connected to the main bus 61, and controls DMA transfer for respective circuits connected to the sub bus 62 in accordance with status of the bus interface 63.

A sub CPU 73 configured by a microprocessor and the like, sub-memory 74 configured by RAM, a sub DMAC 75, ROM 70 stored with programs such as an operating program, a sound processing unit (SPU) 77, which reads out sound data stored in sound memory 76 and outputs it as audio output, a USB communication module 78, which carries out wired transmission and reception of information to and from the controller 20 through BT communication, a BT communication module 79, which carries out wireless transmission and reception of information to and from the controller 20 through BT communication, a media drive 71 for loading a predetermined medium 72, and a keyboard 80 are connected to the sub bus 62. The medium 72 is a recording medium such as a CD-ROM or DVD-ROM recorded with a program for image processing. The device main unit 10 reads this program for image processing so as to execute necessary entertainment processing. The USB communication module 78 includes the controller ports 11 (shown in FIG. 1), and the BT communication module 79 includes the wireless communication unit 16 (shown in FIG. 1).

Furthermore, if either the USB communication module 78 or the BT communication module 79 receives a signal from the controller 20, the main CPU 64 generates a display list based on that received signal and outputs it to the GPU 68.

The sub CPU 73 carries out various operations in accordance with the program stored in the ROM 70. The sub DMAC 75 controls DMA transfer for respective circuits connected to the sub bas 62 only when the bus interface 63 is detached from the main bus 61 and the sub bas 62.

When transmitting data from the BT communication module 79 to the controller 20, the main CPU 64 executes output data generation processing described later so as to generate packet output data. When the BT communication module 79 receives data from the controller 20, the main CPU 64 executes input data analysis processing described later. Note that the output data generation processing and the input data analysis processing may be executed by the sub CPU 73.

[Structure of Controller]

Figure 3:
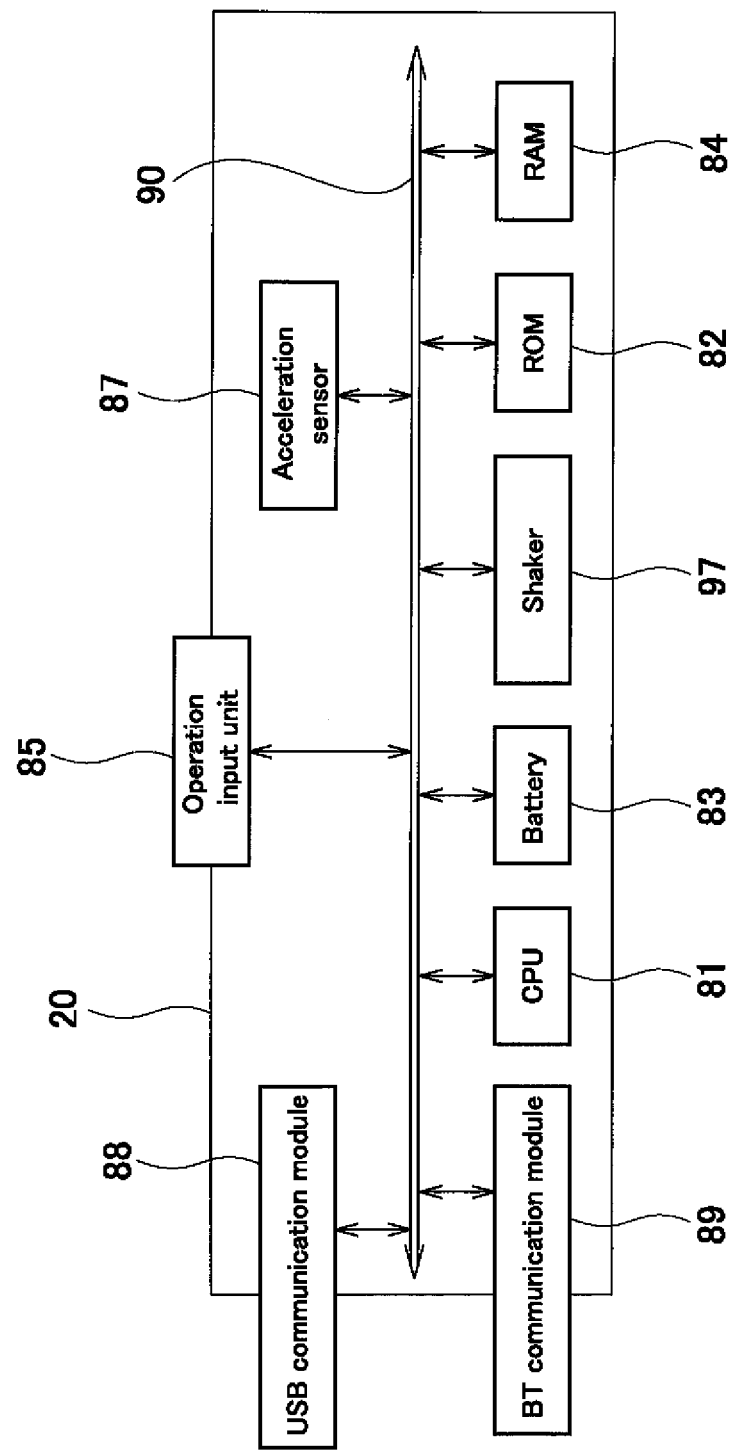
FIG. 3 is a block diagram showing a principal electrical structure of a controller.

FIG. 3 shows the principal electrical structure of the controller 20.

As shown in FIG. 3, the controller 20 includes a CPU 81, ROM 82, RAM 84, a battery 83, an operation input unit 85, an acceleration sensor 87, a shaker 97, a USB communication module 88, and a BT communication module 89, which are connected via a bus 90. The operation input unit 85 is a general term for various operation buttons (command input button, power button, HOME button, mode switch, and the like) provided on the outer surface of a frame of the controller 20. The shaker 97 is a vibration generating device for vibrating the controller 20.

The USB communication module 88 transmits and receives information through wired communication with the device main unit 10 via a USB connecting cable, and the BT communication module 89 wirelessly transmits and receives information with the device main unit 10 through BT communication. The USB communication module 88 includes the connection ports 15 and 18 (shown in FIG. 1), and the BT communication module 89 includes the wireless communication unit 17 (shown in FIG. 1).

Note that a USB cable 13 (shown in FIG. 1) connecting the controller 20 and the device main unit 10 includes a power line, and with a USB connection, the device main unit 10 supplies power to the controller 20 via the power line and charges the battery 83.

The CPU 81 executes predetermined processing such as start processing, input packet generation processing, signal transmission processing, signal reception processing, and vibration control processing.

The start processing reads a start program from the ROM 82 when activating the controller 20 and then executes the start program. The input packet generation processing generates packet input data (fundamental packet input data or extended packet input data described later) corresponding to an operation input from the user using the operation input unit 85. The packet input data is usable for the predetermined format packet communication, which corresponds to the predetermined capacity 48 bytes and the predetermined format I2C. The signal transmission processing transmits the packet input data, which is generated through the input packet generation processing, to the device main unit 10 from either the USB communication module 88 or the BT communication module 89 every predetermined cycle. The signal reception processing makes either the USB communication module 88 or the BT communication module 89 receive the packet output data, which is transmitted from the device main unit 10, every predetermined cycle. The vibration control processing makes the shaker 97 vibrate in accordance with shake information included in the packet output data that the USB communication module 88 or the BT communication module 89 has received from the device main unit 10. Details of the input packet generation processing and the signal reception processing will be described later.

A product ID and scenario information are prestored in the ROM 82 as extension apparatus identification information. The product ID is attribute information for determining and identifying type of device. The scenario information includes integrated scenario information and extraction scenario information.

The second controller 40 has the same basic structure as the controller 20. However, the second controller 40 functions as an extension apparatus of the controller 20 when it is wire-connected to the controller 20 in extend mode. In this case, a CPU 81E of the second controller 40 prohibits direct communication with the device main unit 10, and transmits an operation signal, which corresponds to an operation input from the user using an operation input unit 85E, as extended input data to the controller 20 from a USB communication module 88E. The USB communication module 88E then receives extended output data from the controller 20.

Furthermore, when the second controller 40 is wire-connected to the controller 20, a CPU 81M of the controller 20 detects the wired connection with the second controller 40, and as described later, once the extend mode transition processing is executed, processing in the input packet generation processing and the signal reception processing is changed from processing for fundamental mode to processing for extend mode.

[Description of Extend Mode Transition Processing]

If the second controller 40 is wire-connected to the controller 20, the controller 20 and the second controller 40 execute extend mode transition processing so as to make transition from the fundamental mode to the extend mode.

During the extend mode transition processing, the CPU 81E of the second controller 40 reads out the product ID and the scenario information from ROM 82E and transmits them to the controller 20. The controller 20 stores the product ID and the scenario information received from the second controller 40 in RAM 84M. Note that the controller 20 may delete the scenario information stored in the RAM 84M when making a transition from the extend mode to the fundamental mode (when the wired connection between the controller 20 and the second controller 40 is released), or the integrated scenario information may be overwritten and updated when making a transition to the extend mode without deleting the scenario information when making a transition to the fundamental mode. Moreover, the controller 20 may also transmit the scenario information obtained from the controller 40 to the device main unit 10.

The controller 20 also transmits to the device main unit 10 through BT communication the product ID of the second controller 40 and extension apparatus connection information indicating that the second controller 40 is connected.

During the extend mode transition processing, the CPU 81E of the second controller 40 prohibits direct communication with the device main unit 10 and transmits an operation signal, which corresponds to an operation input from the user using the operation input unit 85E, to the controller 20 from the USB communication module 88E.

[Description of Input Packet Generation Processing]

The input packet generation processing executed by the CPU 81M of the controller 20 includes fundamental packet input data generation processing during fundamental mode and extended packet input data generation processing during extend mode.

During the fundamental packet input data generation processing, the obtained operation input data in accordance with operation input from the user using an operation input unit 85M of the controller 20 is converted into packets so as to generate fundamental packet input data in the predetermined format I2C with the predetermined capacity of 48 bytes. The generated fundamental packet input data is then transmitted to the device main unit 10 through the signal transmission processing.

During the extended packet input data generation processing, extended packet input data including data based on the extended input data received from the controller 40 is generated in accordance with the integrated scenario information obtained from the second controller 40. The generated, extended packet input data is then transmitted to the device main unit 10 through the signal transmission processing. Note that this extended packet input data always includes the aforementioned extension apparatus connection information.

The integrated scenario information defines regions allotted for the extended input data (hereafter referred to as extended input regions) and regions not allotted to the extended input data (hereafter referred to as original input regions) of data regions for packet input data, extended input regions corresponding to individual extended input data, and integration regulations for the fundamental packet input data and the extended packet input data. The integration regulations are stipulated for the respective data regions and include processing of destroying extended input data (hereafter referred to as processing of maintaining the original input data) while leaving the fundamental packet input data (hereafter referred to as original input data), processing of updating the original input data with the extended input data (hereafter referred to as processing of replacing the original input data with the extended input data), and processing of integrating the original input data and the extended input data (hereafter referred to as processing of merging the original input data and the extended input data). The processing of maintaining the original input data is set in the original input regions, and either the processing of replacing the original input data with the extended input data or the processing of merging the original input data and the extended input data is set in the extended input regions. The processing of merging leaves the original input data when that data is written in the extended input regions, and writes the original input data when it has not been written therein, for example.

FIG. 4 shows exemplary integrated scenario information. FIG. 4 shows that 38 consecutive bytes from the first colored byte to the 38th byte of 48-byte data regions make up original input regions, and eight consecutive bytes from the non-colored 39th byte to the 48th byte make up extended input regions. It shows that the processing of replacing the original input data with the extended input data is executed in regions (Rp01 to Rp06) of the 39th byte, 40th byte, 43rd byte, and from 46th to 48th bytes, and the processing of merging the original input data and the extended input data is executed in regions (Mg01 to Mg04) of the 41st byte, 42nd byte, 44th byte, and 45th byte.

FIG. 5 shows other exemplary integrated scenario information. This example shows extended input regions set non-consecutively, and as in FIG. 4, colored regions are original input regions, and non-colored regions are extended input regions. It also shows that the processing of replacing the original input data with the extended input data is executed in regions (Rp01 to Rp06) of the 18th byte, 22nd byte, 27th byte, 37th byte, 43rd byte, and 48th byte, and the processing of merging the original input data and the extended input data is executed in regions (Mg01 to Mg04) of the 24th byte, 25th byte, 28th byte, and 31st byte.

Capacity (number of bytes) of the extended input regions is set in conformity with the type of extension apparatus. The extended input regions are set with precedence from unused regions, which are not used for the controller 20, of the fundamental packet input data regions, and when there are no unused regions or only the unused regions are insufficient, they are set by appropriately selecting from regions that are infrequently used for the controller 20 or regions in which data of inconsequential information is arranged.

Even when using the same extension apparatus, different integrated scenario information may be used in conformity with an application program executed by the device main unit 10. For example, in the case of executing a game application program for a game which is more interesting as more input operations from the controller 40 are carried out, the integrated scenario information for which extended input regions are widely set should be used, and in the case of executing a game application program for a game which is greatly interesting even with few input operations from the controller 40, the integrated scenario information for which extended input regions are narrowly set should be used. In this case, multiple pieces of integrated scenario information should be prestored in the second controller 40, so as for the controller 20 to select and determine integrated scenario information obtained from the second controller 40 and used in accordance with the application program executed by the device main unit 10.

In this embodiment, fundamental input data corresponding to the packet communication method is generated by arranging the operation input data in the original input regions, extended input data corresponding to the packet communication method is generated by arranging the extended input data in the extended input regions, and the generated fundamental input data and the extended input data are integrated, generating extended packet input data.

For example, in the case of using the integrated scenario information shown in FIG. 4, fundamental input data is generated by arranging the operation input data in the same manner as in the fundamental packet input data generation processing, extended input data is generated by arranging the extended input data in the regions from the 39th byte to the 48th byte, and the fundamental input data and the extended input data are then integrated. During this integration, the fundamental input data in the regions (the original input regions) from the first byte to the 38th byte is maintained as is. In the regions (Rp01 to Rp06) of the 18th byte, 22nd byte, 27th byte, 37th byte, 43rd byte, and 48th byte, the fundamental input data is replaced by the extended input data. In the regions (Mg01 to Mg04) of the 24th byte, 25th byte, 28th byte, and 31st byte, the fundamental input data is merged with the extended input data.

Note that the integration regulations for the fundamental packet input data and the extended packet input data are for all of the data regions for the fundamental packet input data (fundamental input data) as described above, and may also be regulated for just the extended input regions.

[Description of Signal Reception Processing]

The signal reception processing executed by the CPU 81M of the controller 20 includes fundamental reception processing in fundamental mode and extended reception processing in extend mode.

During the fundamental reception processing, the packet output data received from the device main unit 10 is treated as output information to the controller 20. For example, in the case where the received packet output data includes shake information, shake processing is executed in conformity with that shake information, and a shaker 97M is vibrated.

During the extended reception processing, the extended output data is extracted from the packet output data received from the device main unit 10 in conformity with the extraction scenario information obtained from the second controller 40, and the extracted extended output data is transmitted to a USB communication module E of the second controller 40 from a USB communication module 88M. For example, in the case where the received extraction output data includes shake information, a CPU 81E of the second controller 40 executes shake processing in conformity with that shake information so as to make a shaker 97E vibrate.

The extraction scenario information specifies regions (hereafter referred to as extended output regions) for which the extended output data is allotted and regions (hereafter referred to as original output regions) for which extended output data is not allotted of data regions for the packet output data.

Figures 6, 7:
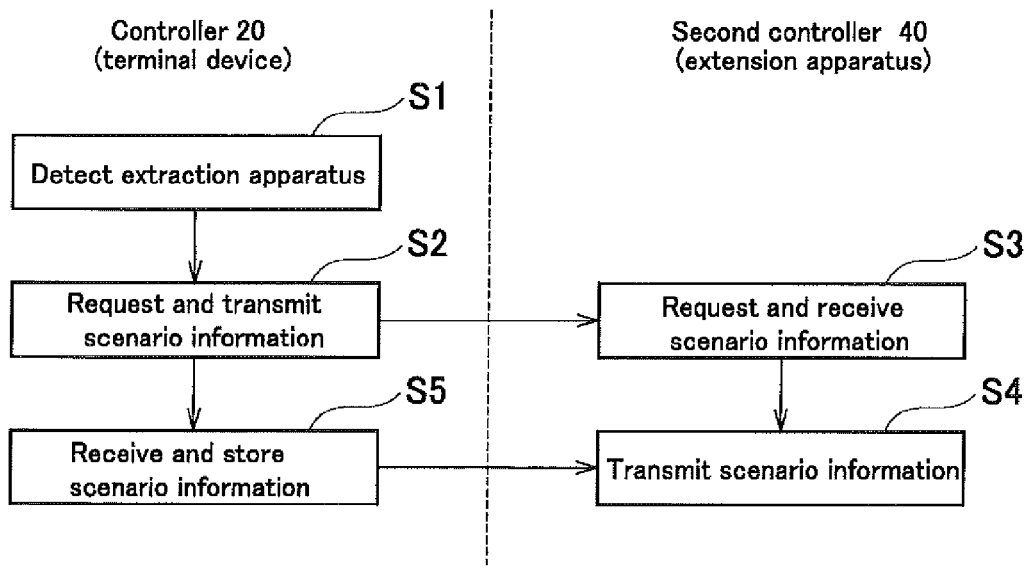
FIG. 6 is a diagram showing exemplary extraction scenario information.
FIG. 7 is a flowchart showing extend mode transition processing.

FIG. 6 shows exemplary extraction scenario information. FIG. 6 shows that eight consecutive bytes from the first colored byte to the eighth byte of 48-byte data regions make up original output regions, and 40 consecutive bytes (Ex01 to Ex40) from the non-colored ninth byte to the 48th byte make up extended output regions.

Capacity (number of bytes) of the extended output regions is set in conformity with the type of extension apparatus. The extended output regions are set with precedence from unused regions, which are not used for the controller 20, of the packet output data regions, and when there are no unused regions or only the unused regions are insufficient, they are set by appropriately selecting from regions that are infrequently used for the controller 20 or regions in which data of inconsequential information is arranged. For example, in the case of an extension apparatus with a relatively large amount of output information such as a speaker, the extended input region should be set wide.

Even when using the same extension apparatus, different extraction scenario information may be used in conformity with an application program executed by the device main unit 10.

[Description of Output Data Generation Processing and Input Data Analysis Processing]

The main CPU 64 of the device main unit 10 judges that the controller 20 is in extend mode when data received from the controller 20 is extended packet input data (when the received data includes extension apparatus connection information). If it is judged to be in extend mode, packet output data according to type of extension apparatus wire-connected to the controller 20 is generated based on the product ID received from the controller 20. An extended data storage region of the packet output data to be generated matches extended data storage region of the extraction scenario information used by the controller 20. For example, when an extension apparatus stored with the extraction scenario information of FIG. 6 is connected, the ninth byte to the 48th byte (Ex01 to Ex40) are extended output regions, and the extended output data for the extension apparatus is arranged in the extended output regions.

Moreover, the main CPU 64 of the device main unit 10 executes analysis processing of the packet input data received from the controller 20. Note that when a program (e.g., a game application program) executed by the main CPU 64 is preset so as to be executed with distinction between normal mode and extend mode, the main CPU 64 executes processing according to judgment result of whether or not the controller 20 is in extend mode in conformity with the aforementioned program.

[Description of Extend Mode Transition]

Processing of the entire system during extend mode transition is described next in chronological order.

As shown in FIG. 7, if the second controller 40 is wire-connected to the controller 20 during power up, the controller 20 detects this connection (step S1), and requests the second controller 40 for transmission of scenario information (step S2). The second controller 40 receives this request (step S3), transmits the scenario information to the controller 20 (step S4), and the controller 20 then stores the received scenario information in the RAM 84M (step S5).

Figure 8:
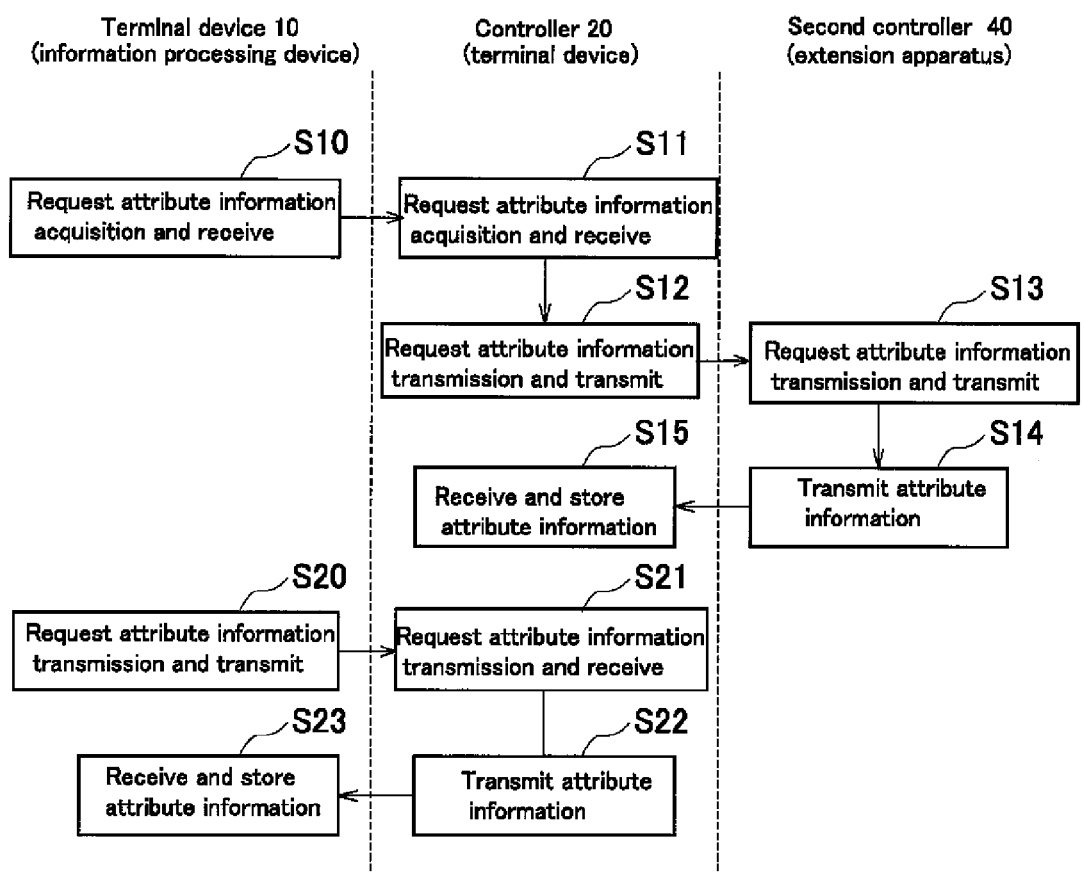
FIG. 8 is a flowchart showing extend mode transition processing.

The device main unit 10 and the controller 20 carry out transmission and reception through packet communication in a predetermined periodic cycle. Upon detection of the connection to the second controller 40, the controller 20 adds extension apparatus connection information to the packet input data, and transmits the entirety to the device main unit 10. The device main unit 10 that has received the packet input data including the extension apparatus connection information requests the controller 20 for acquisition of attribute information including the product ID of the connected extension apparatus, as shown in FIG. 8 (step S10). The controller 20 receives this request (step S11) and requests the second controller 40 for transmission of the attribute information (step S12). The second controller 40 receives this request (step S13) and transmits its own attribute information to the controller 20 (step S14).

The controller 20 that has received the attribute information from the second controller 40 stores this information as buffer values in the RAM 84M (step S15). The device main unit 10 that has requested acquisition of the attribute information then requests the controller 20 for transmission of the attribute information (step S20). The controller 20 that has stored the attribute information of the second controller 40 answers the request from the device main unit 10 (step S21) and transmits the stored attribute information to the device main unit 10 (step S22). The device main unit 10 that has received the attribute information stores it in a storage unit such as the main memory 65 or the sub-memory 74 (step S23). Note that the device main unit 10 that has stored the attribute information requests the controller 20 for initialization of the second controller 40, commands the controller 20 to initialize the second controller 40 in accordance with the request, and the second controller 40 then executes initialization processing in conformity with the command from the controller 20.

[Description of Extend Mode]

Figure 9:
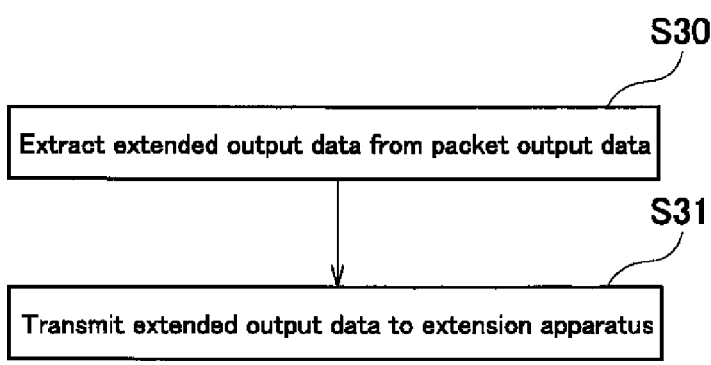
FIG. 9 is a flowchart showing extend mode processing.

When the controller 20 is in extend mode, the device main unit 10 generates packet output data according to type of extension apparatus (second controller 40) wire-connected to the controller 20 based on the product ID received from the controller 20 and stored, and then outputs it to the controller 20. The controller 20 that has received the packet output data executes the extended reception processing. In other words, as shown in FIG. 9, the extended output data is extracted from the received packet output data in accordance with the extraction scenario information obtained from the second controller 40 (step S30), and the extracted extended output data is then transmitted to the second controller 40 (step S31). The second controller 40 executes processing in accordance with the received extended output data.

Figure 10:
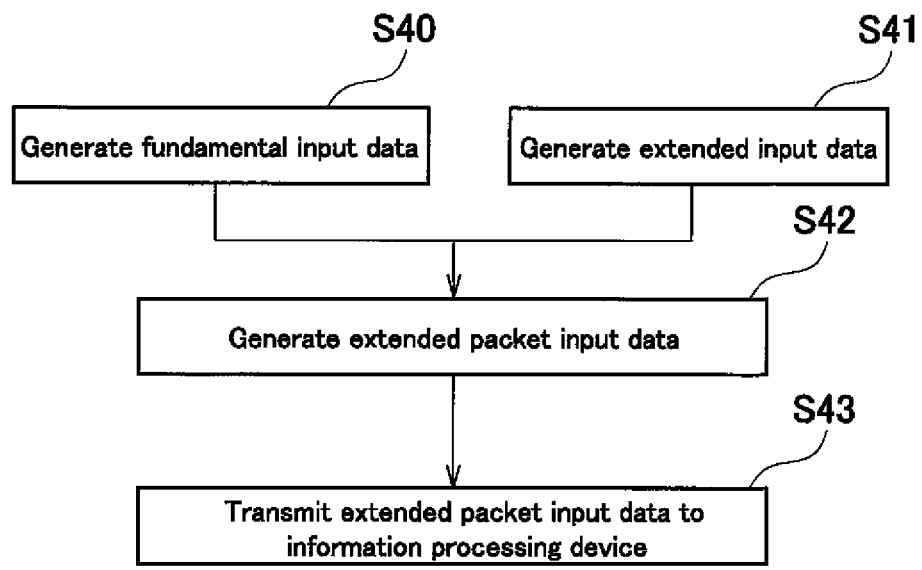
FIG. 10 is a flowchart showing extend mode processing.

Moreover, the controller 20 executes the extended packet input data generation processing. In other words, as shown in FIG. 10, fundamental input data corresponding to the packet communication method is generated by arranging the operation input data in the original input regions in conformity with the integrated scenario information obtained from the second controller 40 (step S40), extended input data corresponding to the packet communication method is generated by arranging the extended input data in the extended input regions (step S41), the generated fundamental input data and the extended input data are integrated, generating extended packet input data (step S42), and the generated extended packet input data is then transmitted to the device main unit 10 (step S43). The device main unit 10 executes analysis processing of the extended packet input data.

For example, it is possible to wire-connect the second controller 40 to the controller 20, grip the controller 20 with the left hand and perform operation inputs with a left finger, and grip the second controller 40 with the right hand and perform operation inputs with a right finger. In other words, the two controllers 20 and 40 may be used simultaneously, one for the right hand and the other for the left hand.

Moreover, the two controllers 20 and 40 may be used as a single unit controller during execution of a confrontational game application program by processing such as transmitting shake information to the controller 20 (arranging shake information in an original output region) when a left hand input operation is inappropriate, and by transmitting shake information to the second controller 40 (arranging shake information in an extended output region) when a right hand input operation is inappropriate is possible.

Furthermore, in the case where a specialized exclusive controller for the game application program to be executed is provided, and the exclusive controller does not have a BT communication function, the controller 20 may be used as a BT communication apparatus for the exclusive controller by connecting an exclusive controller as an extension apparatus of the controller 20.

Figure 11:
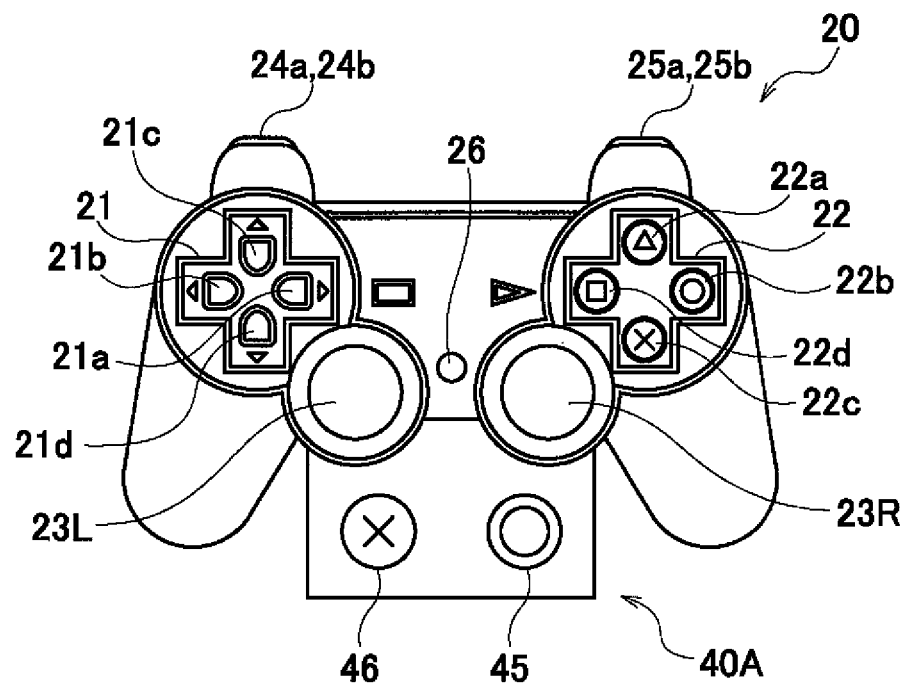
FIG. 11 is a diagram showing an example of a controller and a second controller.

Next, various aspects of the controller 20, the second controller, and the scenario information are exemplified. The controller 20 of each of the examples shares the same basic structure including a left operation part 21, a right operation part 22, a left stick 23L, a right stick 23R, an L1 button 24a, an L2 button 24b, an R1 button 25a, an R2 button 25b, a home button 26, and other related parts, as shown in FIG. 11. The left operation part 21 has directional command buttons (right button 21a, left button 21b, up button 21c, and down button 21d), which are stamped with upward, rightward, downward, and leftward marks, respectively. The right operation part 22 includes four command buttons (triangle display button 22a, circle display button 22b, X display button 22c, and square display button 22d). The left stick 23L and the right stick 23R are capable of tilt operations and orbit operations, and return to neutral positions and maintained when not being operated.

[Application 1]

A second controller 40A of this example is directly connected to the controller 20 and has larger circle display extension button 45 and X display extension button 46 than the circle display button 22b and the X display button 22c of the controller 20, as shown in FIG. 11. The second controller 40A is favorably used for quiz games where answers to submitted questions are input by pressing one of two buttons, for example.

An example of fundamental input data of the controller 20, extended input data of the second controller 40A, integrated scenario information, and integrated results of the case where the second controller 40A is mounted on the controller 20 is given in FIG. 15. The integrated scenario information of FIG. 15 indicates merging of data in an extended input data address (0x008, +00) with that in a fundamental input data address (0x010, +00), and merging of data in an extended input data address (0x008, +01) with that in a fundamental input data address (0x010, +01). The fundamental input data address (0x010, +00) is a data region in which information of a press operation of the X display button 22c of the controller 20 is written, and the extended input data address (0x008, +00) is a data region in which information of a press operation of the X display extension button 46 of the second controller 40A is written. Moreover, the fundamental input data address (0x010, +01) is a data region in which information of a press operation of the circle display button 22b of the controller 20 is written, and the extended input data address (0x008, +01) is a data region in which information of a press operation of the circle extension display extension button 45 of the second controller 40A is written.

In the extend mode using such a second controller 40A and the integrated scenario information, a press operation of either the circle display button 22b or the circle display extension button 45 is treated the same as that of the circle display button 22b in normal mode, and a press operation of either the X display button 22c or the X display extension button 46 is treated the same as that of the X display button 22c in normal mode. Accordingly, the user can perform an arbitrary press operation of the more easy-to-navigate button of either the circle display button 22b or the circle display extension button 45, and can perform an arbitrary press operation of the more easy-to-navigate button of either the X display button 22c or the X display extension button 46. Moreover, there is no need for the device main unit 10 to determine which of the circle display button 22b or the circle display extension button 45 has been operated, and which of the X display button 22c or the X display extension button 46 has been operated.

[Application 2]

Figure 12:
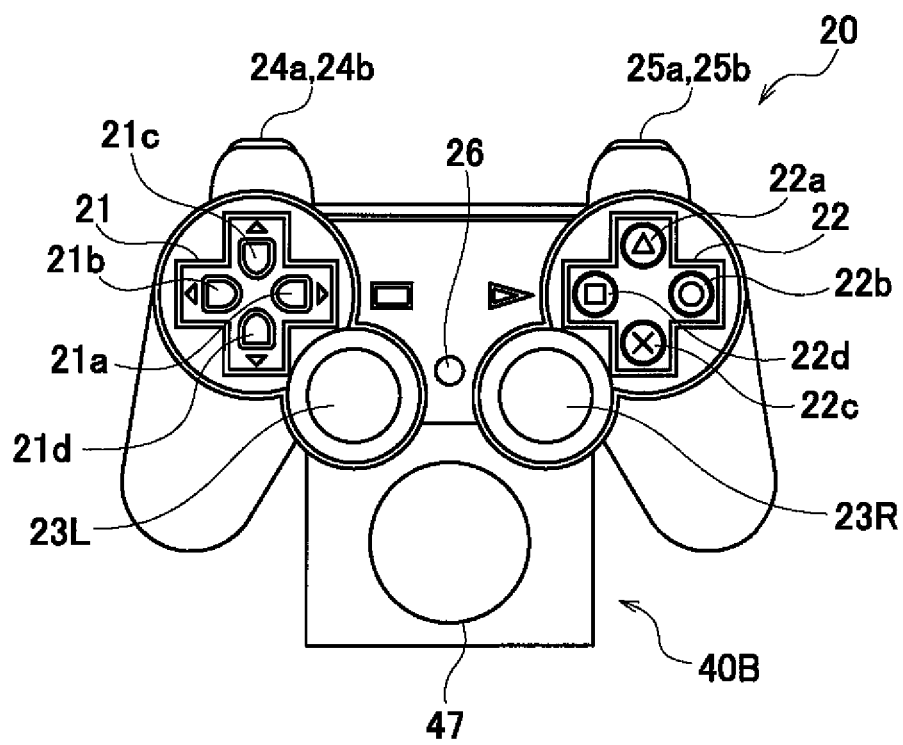
FIG. 12 is a diagram showing another example of a controller and a second controller.

A second controller 40B of this example is directly connected to the controller 20 and has an extension stick 47, as shown in FIG. 12.

An example of fundamental input data of the controller 20, extended input data of the second controller 40B, integrated scenario information, and integrated results of the case where the second controller 40B is mounted on the controller 20 is given in FIG. 16. The integrated scenario information of FIG. 16 indicates replacing the data in a fundamental input data address (0x018, +00) with that in an extended input data address (0x008, +00), and replacing the data in a fundamental input data address (0x018, +01) with that in an extended input data address (0x008, +01). The fundamental input data addresses (0x018, +00) and (0x018, +01) are both empty data regions, and the extended input data addresses (0x008, +00) and (0x008, +01) are both data regions in which information of an operation of the extension stick 47 of the second controller 40B is written. In other words, extended packet input data resulting from adding operation information of the extension stick to the fundamental input data is generated.

Since in the extend mode using such a second controller 40B and the integrated scenario information, operation inputs of the extension stick 47 are added to the operations in the normal mode, operation inputs may be diversified.

[Application 3]

The second controller 40B of this example is the same as in application 3, and is directly connected to the controller 20 and has the extension stick 47, as shown in FIG. 12.

An example of fundamental input data of the controller 20, extended input data of the second controller 40B, integrated scenario information, and integrated results of the case where the second controller 40B is mounted on the controller 20 is given in FIG. 17. The integrated scenario information of FIG. 17 indicates replacing the data in a fundamental input data address (0x008, +04) with that in an extended input data address (0x008, +00), and replacing the data in a fundamental input data address (0x018, +05) with that in an extended input data address (0x008, +01). The fundamental input data addresses (0x008, +04) and (0x008, +05) are both data regions in which information of an operation of the left stick 23L of the controller 20 is written, and the extended input data addresses (0x008, +00) and (0x008, +01) are both data regions in which information of an operation of the extension stick 47 of the second controller 40B is written.

Since in the extend mode using such a second controller 40B and the integrated scenario information, operation of the left stick 23L is replaced by operation of the extension stick 47. Note that in this case, information of operations of the left stick 23L is not transmitted to the device main unit 10.

[Application 4]

Figure 13:
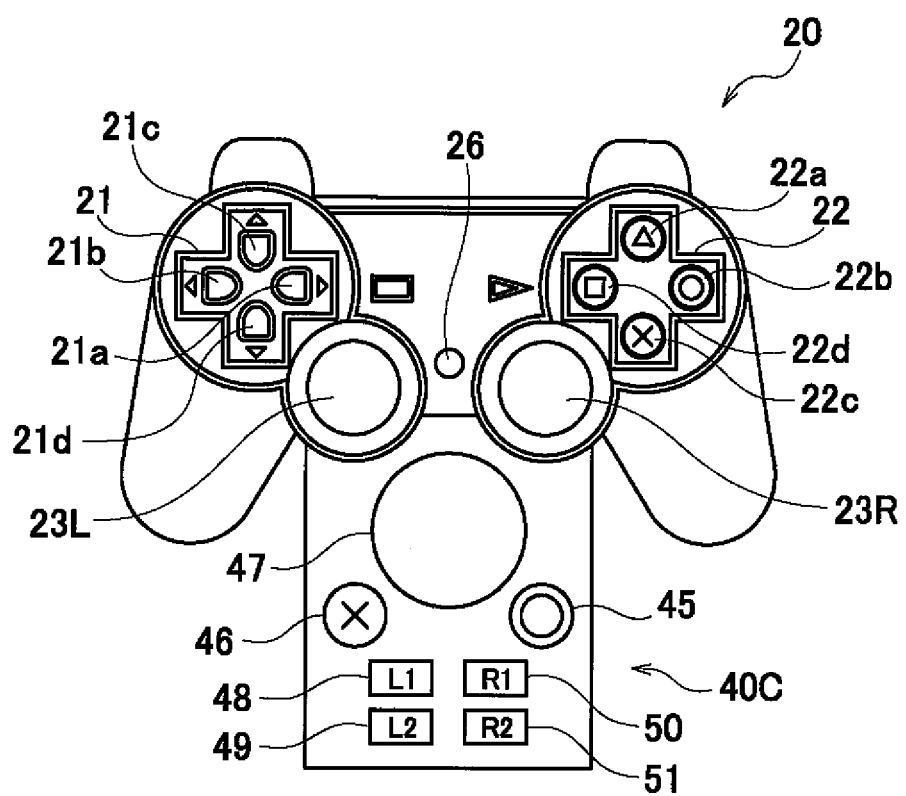
FIG. 13 is a diagram showing another example of a controller and a second controller.

A second controller 40C of this example is directly connected to the controller 20 and has the circle display extension button 45, the X display extension button 46, the extension stick 47, an L1 button 48, an L2 button 49, an R1 button 50, and an R2 button 51, as shown in FIG. 13. Note that the controller 20 does not have an L1 button, an L2 button, an R1 button and an R2 button.

An example of fundamental input data of the controller 20, extended input data of the second controller 40C, integrated scenario information, and integrated results of the case where the second controller 40C is mounted on the controller 20 is given in FIG. 18. The integrated scenario information of FIG. 18 indicates merging of the data in the extended input data address (0x008, +00) with that in the fundamental input data address (0x010, +00), merging of data in the extended input data address (0x008, +01) with that in the fundamental input data address (0x010, +01), replacing data in a fundamental input data address (0x010, +04) with that in an extended input data address (0x008, +04), replacing data in a fundamental input data address (0x010, +05) with that in an extended input data address (0x008, +05), replacing data in a fundamental input data address (0x010, +06) with that in an extended input data address (0x008, +06), replacing data in a fundamental input data address (0x010, +07) with that in an extended input data address (0x008, +07), replacing data in a fundamental input data address (0x018, +00) with that in an extended input data address (0x008, +02), and replacing data in a fundamental input data address (0x018, +01) with that in an extended input data address (0x008, +03).

The fundamental input data address (0x010, +00) is a data region in which information of a press operation of the X display button 22c of the controller 20 is written, and the extended input data address (0x008, +00) is a data region in which information of a press operation of the X display extension button 46 of the second controller 40C is written. The fundamental input data address (0x010, +01) is a data region in which information of a press operation of the circle display button 22b of the controller 20 is written, and the extended input data address (0x008, +01) is a data region in which information of a press operation of the circle extension display extension button 45 of the second controller 40C is written. The fundamental input data addresses (0x010, +04), (0x010, +05), (0x010, +06), and (0x010, +07) are all empty data regions. The extended input data addresses (0x008, +04), (0x008, +05), (0x008, +06), and (0x008, +07) are data regions in which information of press operations of the extension stick 47, the L1 button 48, the R1 button 50, the L2 button 49, and the R2 button 51 of the second controller 40B are written. The fundamental input data addresses (0x018, +00) and (0x018, +01) are both empty data regions, and the extended input data addresses (0x008, +02) and (0x018, +03) are both data regions in which information of an operation of the extension stick 47 of the second controller 40C is written.

In the extend mode using such a second controller 40C and the integrated scenario information, a press operation of either the circle display button 22b or the circle display extension button 45 is treated the same as that of the circle display button 22b in normal mode, and a press operation of either the X display button 22c or the X display extension button 46 is treated the same as that of the X display button 22b in normal mode. Moreover, operation inputs of the extension stick 47, the L1 button 48, the L2 button 49, the R1 button 50, and the R2 button 51 are added to the operations in the normal mode.

[Application 5]

Figure 14:
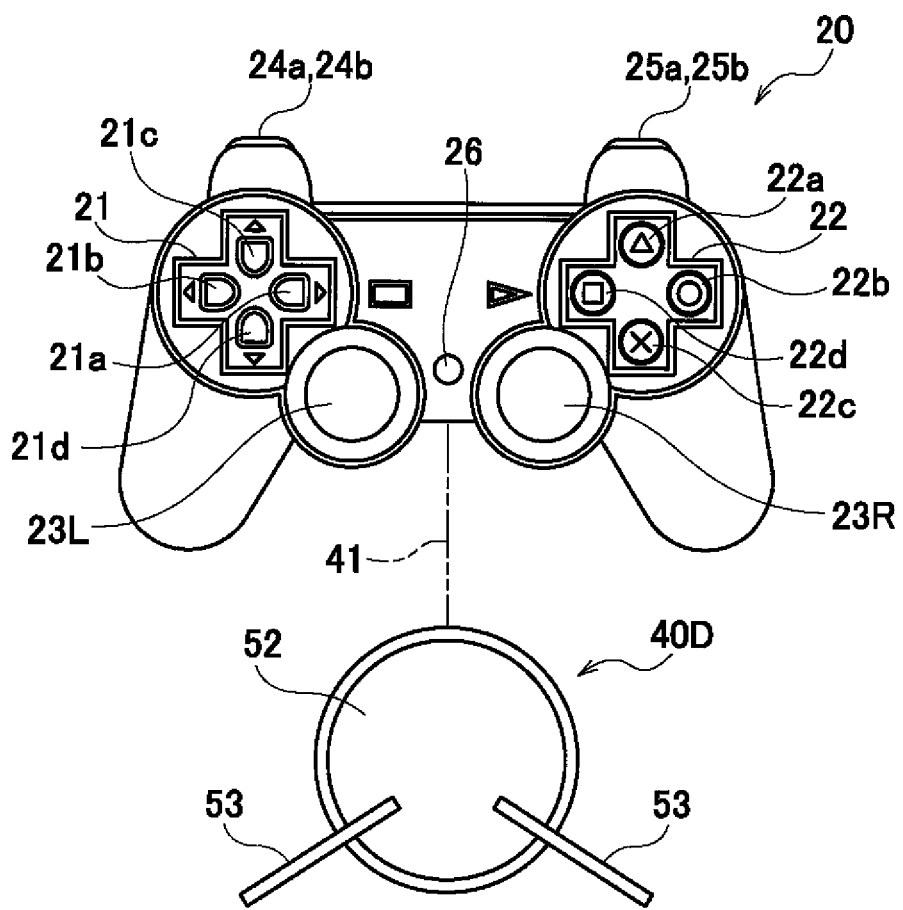
FIG. 14 is a diagram showing another example of a controller and a second controller.

A second controller 40D of this example is a drum-type controller connected to the controller 20 via an extension cable 41, and has a top head 52 that is hit using a stick 53 or the like by the user, as shown in FIG. 14. The second controller 40D detects beating on the top head 52 and outputs a corresponding signal. This second controller 40D is favorably used for a game of entering a rhythm to music, for example.

An example of fundamental input data of the controller 20, extended input data of the second controller 40D, integrated scenario information, and integrated results of the case where the second controller 40D is mounted on the controller 20 is given in FIG. 19. The integrated scenario information of FIG. 19 indicates replacing pieces of data in fundamental input data addresses (0x000, +00), (0x000, +01), (0x000, +02), (0x000, +03), (0x000, +04), (0x000, +05), (0x000, +06), (0x000, +07), (0x008, +00), (0x008, +01), and (0x008, +02) with those in extended input data addresses (0x000, +00), (0x000, +01), (0x000, +02), (0x000, +03), (0x000, +04), (0x000, +05), (0x000, +06), (0x000, +07), (0x008, +00), (0x008, +01), and (0x008, +02), respectively. The fundamental input data addresses (0x000, +00), (0x000, +01), (0x000, +02), (0x000, +03), (0x000, +04), (0x000, +05), (0x000, +06), and (0x000, +07) are data regions in which setup information (e.g., product ID) of the controller 20 is written, and the extended input data addresses (0x000, +00), (0x000, +01), (0x000, +02), (0x000, +03), (0x000, +04), (0x000, +05), (0x000, +06), and (0x000, +07), are data regions in which setup information (e.g., product ID) of the controller 40D is written. The fundamental input data addresses (0x008, +00), (0x008, +01), and (0x008, +02) are data regions in which information of press operations of the X display button 22c, the circle display button 22b, the square display button 22d of the controller 20 are written, respectively, and the extended input data addresses (0x008, +00), (0x008, +01), and (0x008, +02) are data regions in which input information (e.g., information regarding a beating input) for the controller 40D is written.

Since in the extend mode using such a second controller 40D and the integrated scenario information, press operations of the X display button 22c, the circle display button 22b, the square display button 22d in normal mode are replaced by input operations of the controller 40D.

Moreover, all of the setup information of the controller 20 is replaced with setup information of the second controller 40D. As a result, the device main unit 10 is in a state of actually carrying out communication with the controller 20 while recognizing the second controller 40 as a communication partner. In other words, the controller 20 functions only as a wireless communication means (BT communication apparatus) of the second controller 40D.

[Description of Basic Format of Integrated Scenario Information]

A basic format of integrated scenario information is described next. FIG. 20 is a expanded-in-memory view of a format for the integrated scenario information.

As shown in FIG. 20, the integrated scenario information is made in a single unit or multiple units of a basic format when the basic format comprises the single unit. The basic format of the single unit is structured by a combination of 'attribute value', 'integration target packet internal first address', 'integration host I/O device first address', 'trial count', and 'parameter'. In the above embodiment, the controller (terminal device) 20 is an integration target device, and the second controller (extension apparatus) 40 is an integration host device. Integrated scenario information is regulated by setting an arbitrary scenario defining region in accordance with the structure of the basic format. Setting of the integrated scenario information of a single unit as a basic unit in this manner allows various compositions such as a combined composition with a different attribute value, integration and mask processing with an arbitrary parameter, and the like.

Note that while transmission target and host is limited to packet and I/O devices such as a packet internal address or an I/O device apparatus in the following description, they may be arbitrary memory space or arbitrary I/O space.

[Description of Attribute Values]

An attribute value included in the integrated scenario information in the basic format is a parameter defining what type of integration processing to execute for information within the integration target packet internal address, and examples thereof are shown in FIG. 21. Processing defined by attribute values (parameters) includes types such as Merge, Replace, and Mask. Examples of merge (Mg), replace (Rp), And (Mask processing), Or (Mask processing), Not (Mask processing), and Fill (Fil) are described next.

[Example of Merge (Mg)]

Integrated scenario information (1 unit) of this example is attribute value 0x01 (Mg), integration target packet internal address 0x05, integration host I/O device address 0x10, trial count 0x01, and parameter 0x00 (not yet determined). The format structure (expanded-in-memory view) of the integrated scenario information is set as in FIG. 22, and the integration target packet and integration host I/O device are as shown in FIG. 23 and FIG. 24, respectively. Note that FIG. 24 illustrates the case where button information is 0x44.

During the integration processing, an ORed value of the integration target packet (information (0x23) in address 0x05) and the integration host I/O device (information (0x44) in address 0x10) is calculated, resulting in 0x67. This value is the integration target packet address and is stored in address 0x05. Since the trial count is set to 0x01 in this example, the integration processing ends here, resulting in a post-calculation integration target packet as shown in FIG. 25. Note that when the trial count is set to a value of 0x02 or greater, the integration host and integration target addresses are incremented, and the same processing is repeated. Moreover, since processing when the trial count is set to a value of 0x02 or greater is the same in the respective examples of Replace (Rp), And (Mask processing), Or (Mask processing), Not (Mask processing), and Fill (Fil) described next, description thereof is omitted.

[Example of Replace (Rp)]

Integrated scenario information (1 unit) of this example is attribute value 0x02 (Rp), integration target packet internal address 0x05, integration host I/O device address 0x10, trial count 0x01, and parameter 0x00 (not yet determined). The format structure (expanded-in-memory view) of the integrated scenario information is set as in FIG. 26, and the integration target packet and integration host I/O device are the same as in the above Merge example as shown in FIG. 23 and FIG. 24, respectively.

During the integration processing, the integration target packet (information (0x23) in address 0x55) is replaced with the integration host I/O device (information (0x44) in address 0x10), and information in the integration target packet address (address 0x05) is 0x44. Since the trial count is set to 0x01 in this example, the integration processing ends here, resulting in a post-calculation integration target packet as shown in FIG. 27.

[Example of And (Mask Processing)]

Integrated scenario information (1 unit) of this example is attribute value 0x03 (And), integration target packet internal address 0x05, integration host I/O device address 0x00 (not yet determined), trial count 0x01, and parameter 0x55. The format structure (expanded-in-memory view) of the integrated scenario information is set as in FIG. 28, and the integration target packet is the same as in the above Merge example as shown in FIG. 23.

During the integration processing, an AND calculation (0x23 and 0x55) of the integration target packet (information (0x23) in address 0x05) and the parameter value (0x55) in the scenario is performed, and the result (0x01) is stored in the integration target packet (address 0x05). Since the trial count is set to 0x01 in this example, the integration processing ends here, resulting in a post-calculation integration target packet as shown in FIG. 29.

[Example of Or (Mask Processing)]

Integrated scenario information (1 unit) of this example is attribute value 0x04 (Or), integration target packet internal address 0x05, integration host I/O device address 0x00 (not yet determined), trial count 0x01, and parameter 0x55. The format structure (expanded-in-memory view) of the integrated scenario information is set as in FIG. 30, and the integration target packet is the same as in the above Merge example as shown in FIG. 23.

During the integration processing, an OR calculation (0x23 or 0x55) of the integration target packet (information (0x23) in address 0x05) and the scenario parameter (0x55) is performed, and the result (0x77) is stored in the integration target packet (address 0x05). Since the trial count is set to 0x01 in this example, the integration processing ends here, resulting in a post-calculation integration target packet as shown in FIG. 31.

[Example of Not (Mask Processing)]

Integrated scenario information (1 unit) of this example is attribute value 0x05 (Not), integration target packet internal address 0x05, integration host I/O device address 0x00 (not yet determined), trial count 0x01, and parameter 0x55.

The format structure (expanded-in-memory view) of the integrated scenario information is set as in FIG. 32, and the integration target packet is the same as in the above Merge example as shown in FIG. 23.

During the integration processing, a NOT calculation (0x23 not 0x55) of the integration target packet (information (0x23) in address 0x05) and the scenario parameter (0x55) is performed, and the result (0x88) is stored in the integration target packet (address 0x05). Since the trial count is set to 0x01 in this example, the integration processing ends here, resulting in a post-calculation integration target packet as shown in FIG. 33.

[Example of Fill (Fill Processing)]

Integrated scenario information (1 unit) of this example is attribute value 0x06 (Fill), integration target packet internal address 0x05, integration host I/O device address 0x00 (not yet determined), trial count 0x01, and parameter 0x55. The format structure (expanded-in-memory view) of the integrated scenario information is set as in FIG. 34, and the integration target packet is the same as in the above Merge example as shown in FIG. 23.

During the integration processing, the integration target packet (information (0x23) in address 0x05) is replaced by the scenario parameter (0x55), and the result (0x55) is stored in the integration target packet (address 0x05). Since the trial count is set to 0x01 in this example, the integration processing ends here, resulting in a post-calculation integration target packet as shown in FIG. 35.

[Application]

Next, an example of receiving from the extension apparatus (integration host I/O device) input information (address 0x00) of the circle display button 22b and input information (address 0x01) of the X display button 22 not existing in the integration target packet and then executing the merge (integration) processing in the case where the second controller (extension apparatus) 40 has the circle display button 22*b* and the X display button 22*c* but the controller (terminal device) 20 is described. In this example, when the extension apparatus is connected, information of the respective integration target packets L1, L2, L3, R1, R21 and R3 are processed so as to be in an OFF state (0x00). The integration target packet and the integration host I/O device are as shown in FIGS. 36 and 27, and the format structure (expanded-in-memory view) of the integrated scenario information is set as in FIG. 38. Note that FIG. 37 shows the case where both the circle display button 22*b* and the X display button 22*c* are depressed (both button information is ON).

In the processing in accordance with a defined scenario of the first unit of FIG. 38 during the integration processing, information (information (O (ON) in address 0x10) of the integration host I/O device and information (x (ON)) in address 0x11 that have undergone merge processing are stored in integration target packets (addresses 0x00 and 0x01). Details of storage and calculations are as follows.

(1) Integration target packet address (0x00)=[information in old integration target packet address (0x00)] OR [information of integration host I/O device (address 0x10 (O (ON)))

(2) Integration target packet address (0x01)=[information in old integration target packet address (0x01)] OR [information of integration host I/O device (address 0x11 (x (ON))]

In the second scenario (scenario defined for the subsequent unit), since attribute value is Fill, integration target packet first address or processing target is (address 0x08), trial count is 0x06, and parameter is 0x00, the following may be replaced:

(3) integration target packet address (0x08)=0x00
(4) integration target packet address (0x09)=0x00
(5) integration target packet address (0x0A)=0x00
(6) integration target packet address (0x0B)=0x00
(7) integration target packet address (0x0C)=0x00
(8) integration target packet address (0x0D)=0x00

As a result of the above processing, latest information of the integration target packet as shown in FIG. 39 is generated.

As described above, according to this embodiment, the user wanting to extend function of the controller 20 by transmitting and receiving data to and from the device main unit 10 through packet communication in a predetermined format and predetermined capacity may use a desired extension apparatus merely by wire-connecting that extension apparatus to the controller 20.

<Modification>

While the above embodiment, the controller 20 obtains scenario information from the second controller 40, the scenario information may be obtained from another apparatus.

For example, scenario information may be prestored in the device main unit 10, an application program to be executed by the device main unit 10, a network server to which the device main unit 10 is connected, or the like. Alternatively, the scenario information may be stored for each type of extension apparatus. In the case where the scenario information is stored in the device main unit 10 or an application program for each type of extension apparatus, during transition to extend mode, the device main unit 10 obtains the product ID of the second controller 40 from the controller 20, identifies scenario information corresponding to the product ID of the second controller 40 in multiple pieces of scenario information provided, and transmits it to the second controller 40. In the case where the scenario information is stored in each type of extension apparatus such as a network server, the device main unit 10 obtains the scenario information corresponding to the product ID of the second controller 40 via the network and then transmits it to the second controller 40.

Note that the descriptions of the respective embodiments given above are merely examples of the present invention. Therefore, the present invention is not limited to the respective embodiments given above, and it is needless to say that various changes may be made without departing from the spirit or scope of the present invention.

The present invention may be applied to a communication system for transmitting and receiving data through packet communication.

DESCRIPTION OF REFERENCE NUMERALS

10: device main unit, 20: controller, 40: second controller

The invention claimed is:

1. A communication system comprising: an information processing unit with addressable memory;
   a terminal device for transmitting packet input data to the information processing unit through packet communication according to a predetermined method for which format and capacity are regulated; and
   an extension apparatus connected to the terminal device in an attachable and removable manner,
   wherein the terminal device is a game controller or portable game console,
   wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode,
   wherein said extension apparatus is configured to transmit a product ID of said extension apparatus along with integrated scenario information to said terminal device, wherein said terminal device transmits the product ID and integrated scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity allotted for the extended packet input data is set in conformity with the type of extension apparatus identified via the product ID, and packet output data is generated by the information processing unit according to the type of extension apparatus identified,
   wherein said memory region allotment is governed by integration regulations selected from the group consisting of: (1) maintaining original input data, (2) replacing original input data with the extended input data, or (3) merging original input data and extended input data, and
   wherein the terminal device comprises
      an operation input unit configured to receive operation input from a user,
      a packet generation unit configured to convert the operation input data into packet input data, wherein the packet generation unit generates extended packet input data based on the integrated scenario information when the extension apparatus is connected to the terminal device, and transmits said extended packet input data to said information processing unit, an extended data reception unit configured to receive extended input data from the extension apparatus and extended output data from the information processing unit, a packet data processing unit configured to analyze received packet output data from said information processing unit, a storage unit for storing extraction scenario information received from said information processing unit, wherein said extraction scenario information designates a memory region in the extension apparatus for said packet output data, wherein when the extension apparatus is connected, said packet data processing unit extracts, based on the extraction scenario information, extended output data for the extension apparatus from packet output data received from the information processing unit and then transmits the extracted extended output data to the extension apparatus for processing.

2. The communication system of claim 1, wherein the integrated scenario information defines a first input region allotted for the terminal device and a second input region allotted for the extension apparatus within data regions for the packet input data, wherein the first and second input regions are areas of memory allotted for fundamental packet input data and extended packet input data, respectively, and the packet generation unit, when the extension apparatus is connected to the terminal device, arranges the operation input data in the first input region defined in the integrated scenario information, arranges data based on the extended input data in the second input region defined in the integrated scenario information, and then generates the packet input data.

3. The communication system of claim 2, wherein the packet generation unit, when the extension apparatus is connected to the terminal device, generates fundamental input data corresponding to the predetermined method by arranging the operation input data in the first input region, generates extended input data corresponding to the predetermined method by arranging the extended input data in the second input region, and the integrates the fundamental input data and the extended input data, thereby generating the packet input data.

4. The communication system of claim 1, wherein the integrated scenario information is prestored in the extension apparatus, and the terminal device obtains integrated scenario information from the extension apparatus when the extension apparatus is connected thereto.

5. A communication system comprising:

an information processing unit for transmitting packet output data through packet communication according to a predetermined method for which format and capacity are regulated;

a terminal device for receiving packet output data from the information processing unit, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode; and an attachable and removable extension apparatus connected to the terminal device, wherein said extension apparatus is configured to transmit a product ID of said extension apparatus and scenario information to said terminal device, wherein said terminal device transmits the product ID and integrated scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified, wherein the terminal device comprises a packet data processing unit configured to execute analysis processing of the received packet output data and a storage unit configured to store extraction scenario information defining a region allotted for the extension apparatus within data regions for the packet output data, and when the extension apparatus is connected, the packet data processing unit extracts the extended output data for the extension apparatus from the packet output data based on the extraction scenario information, and then transmits the extracted extended output data to the extension apparatus.

6. The communication system of claim 5, wherein the extension apparatus is prestored with extension apparatus identification information capable of specifying at least its own type, the terminal device obtains extension apparatus identification information from the connected extension apparatus and transmits it to the information processing device, and the information processing device generates packet output data in accordance with the received extension apparatus identification information.

7. The communication system of claim 5, wherein the extraction scenario information is prestored in the extension apparatus, and the terminal device obtains extraction scenario information from the extension apparatus when the extension apparatus is connected to the terminal device.

8. A terminal device for transmitting packet input data to an information processing unit, with addressable memory, through packet communication according to a predetermined method for which format and capacity are regulated, wherein an attachable and removable extension apparatus is connected to the terminal device; said terminal device comprising:

an operation input unit configured to receive an operation input from a user;

a packet generation unit configured to make the operation input data obtained from the operation input unit into a packet so as to generate the packet input data;

a storage unit configured to store integrated scenario information, wherein said integrated scenario information defines regions in said memory allotted for extended input data from the the extension apparatus within regions reserved for the packet input data, wherein said allotment is governed by integration regulations selected from the group consisting of: (1) maintaining original input data, (2) replacing original input data with the extended input data, or (3) merging original input data and extended input data, and an extended data reception unit in said terminal device configured to receive extended input data from the extension apparatus, wherein the packet generation unit generates extended packet input data based on the extended input data received from said extension apparatus in accordance with the integrated scenario information when the extension apparatus is connected to the terminal device, and then transmits said extended packet input data to said information processing unit, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein said extension apparatus is configured to transmit a product ID of said extension apparatus and scenario information to said terminal device, wherein said terminal device transmits the product ID and integrated scenario information to said information processing unit, wherein, in accordance with said integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified.

9. The terminal device of claim 8, wherein
the integrated scenario information defines a first input region allotted for the terminal device and a second input region allotted for the extension apparatus within data regions for the packet input data, wherein the first and second input regions are areas of memory allotted for fundamental packet input data and extended packet input data, respectively, and the packet generation unit, when the extension apparatus is connected to the terminal device, arranges the operation input data in the first input region defined in the integrated scenario information, arranges data based on the extended input data in the second input region defined in the integrated scenario information, and then generates the packet input data.

10. The terminal device of claim 9, wherein
the packet generation unit, when the extension apparatus is connected to the terminal device, generates fundamental input data corresponding to the predetermined method by arranging the operation input data in the first input region, generates extended input data corresponding to the predetermined method by arranging the extended input data in the second input region, and the integrates the fundamental input data and the extended input data, thereby generating extension the packet input data.

11. The terminal device of claim 8, wherein
the integrated scenario information is prestored in the extension apparatus, and
the terminal device obtains integrated scenario information from the extension apparatus when the extension apparatus is connected to the terminal device.

12. A terminal device for receiving packet output data from an information processing unit through packet communication according to a predetermined method for which format and capacity are regulated, wherein an attachable and removable extension apparatus is connected to the terminal device, said terminal device comprising:

a packet data processing unit configured to execute analysis processing of the received packet output data; and a storage unit configured to store integrated scenario information obtained from the extension apparatus defining a region allotted for the extension apparatus within data regions for the packet input data, wherein when the extension apparatus is connected, the packet data processing unit extracts the extended output data for the extension apparatus from the packet output data based on the extraction scenario information, and then transmits the extracted extended output data to the extension apparatus, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein said extension apparatus is configured to transmit a product ID of said extension apparatus and scenario information to said terminal device, wherein said terminal device transmits the product ID and integrated scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified.

13. The terminal device of claim 12, wherein
the extraction scenario information is prestored in the extension apparatus, and
the terminal device obtains extraction scenario information from the extension apparatus when the extension apparatus is connected to the terminal device.

14. A communication processing method executed by a terminal device for transmitting packet input data to an information processing unit, with addressable memory, through packet communication according to a predetermined method for which format and capacity are regulated, wherein an attachable and removable extension apparatus is connected to the terminal device, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode; said communication processing method comprising the steps of:

receiving an operation input from a user;

receiving extended input data from the extension apparatus when the extension apparatus is connected to the terminal device;

generating packet input data, when the extended input data has been received, based on the extended input data received from said extension apparatus in accordance with an integrated scenario, wherein said integrated scenario defines regions in said memory allotted for extended input data from the extension apparatus within regions reserved for the packet input data, wherein said allotment is governed by integration regulations selected from the group consisting of: (1) maintaining original input data, (2) replacing original input data with the extended input data, or (3) merging original input data and extended input data, wherein the memory capacity of the extended input regions are set in conformity with the type of extension apparatus identified via the product ID and packet output data is generated by the information processing unit according to the type of extension apparatus identified.

15. A communication processing method executed by a terminal device for receiving packet output data from an information processing unit through packet communication according to a predetermined method for which format and capacity are regulated, wherein an attachable and removable extension apparatus is connected to the terminal device, said communication processing method comprising the steps of:

extracting extended output data for the extension apparatus from the packet output data based on an integrated scenario defining a region allotted for the extension apparatus within data regions for the packet output data when the extended data is connected; and transmitting the extracted extended output data to the extension apparatus, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein said extension apparatus is configured to transmit a product ID of said extension apparatus and scenario information to said terminal device, wherein said terminal device transmits the product ID and scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified.

16. A non-transitory, computer readable storage medium containing a communication processing program for making a computer of a terminal device transmit packet input data to an information processing unit, with addressable memory, through packet communication according to a predetermined method for which format and capacity are regulated, and for making the terminal device function as a packet generation unit configured to generate the packet input data, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein packet input data generated during fundamental mode (fundamental packet input data) is allocated to different memory regions than packet input data generated during extend mode (extended packet input data).

17. A non-transitory, computer readable storage medium containing a communication processing program for making a computer of a terminal device receive packet output data from an information processing unit through packet communication according to a predetermined method for which format and capacity are regulated, and for making the terminal device function as a packet data processing unit configured to extract extended output data for the extension apparatus from the packet output data based on an integrated scenario defining a region allotted for the extension apparatus within data regions for the packet output data when an attachable and removable extension apparatus is connected to the terminal device, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein said extension apparatus is configured to transmit a product ID of said extension apparatus and scenario information to said terminal device, wherein said terminal device transmits the product ID and scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified.

18. The communication system of claim 1, wherein said format is 12C format and said capacity is 48 bytes.

19. An apparatus, comprising:
an extension apparatus configured to connect to a terminal device in an attachable and removable manner for transmitting packet input data to an information processing unit through packet communication according to a predetermined method for which format and capacity are regulated, wherein the terminal device comprises an operation input unit configured to receive an operation input from a user at an operation input unit, a packet generation unit configured to make the operation input data obtained from the operation input unit into a packet so as to generate the packet input data, and an extended data reception unit configured to receive extended input data from the extension apparatus; and a storage unit within said extension apparatus configured to store integrated scenario information, wherein said integrated scenario information defines regions in a memory of the information processing unit allotted for extended input data from the extension apparatus within regions reserved for the packet input data, wherein said allotment is governed by integration regulations selected from the group consisting of: (1) maintaining original input data, (2) replacing original input data with the extended input data, or (3) merging original input data and extended input data, wherein the terminal device is a game controller or portable game console, wherein the terminal device can be in one of two modes: (1) a fundamental mode in which the extension apparatus is not connected to said terminal device and is able to communicate directly with said information processing unit; and (2) an extend mode in which the extension apparatus is connected to said terminal device and is prohibited from communicating directly with said information processing unit, wherein applications executed by said information processing unit are processed according to whether the terminal device is in fundamental mode or extend mode, wherein said extension apparatus is configured to transmit a product ID of said extension apparatus and scenario information to said terminal device, wherein said terminal device transmits the product ID and scenario information to said information processing unit, wherein, in accordance with the integrated scenario information, packet input data generated during fundamental mode (fundamental packet input data) is allocated to different memory regions than packet input data generated during extend mode (extended packet input data), wherein the memory capacity of the extended input regions are set in conformity with the type of extension apparatus identified via the product ID and packet output data is generated by the information processing unit according to the type of extension apparatus identified.

\* \* \* \* \*